United States Patent
Goossen et al.

[11] Patent Number: 5,855,167
[45] Date of Patent: Jan. 5, 1999

[54] END OF ROUND BALE TWINE GUIDE

[75] Inventors: Lavern R. Goossen, Newton; J. Dale Anderson, Canton, both of Kans.

[73] Assignee: Hay & Forage Industries, Hesston, Kans.

[21] Appl. No.: 897,819

[22] Filed: Jul. 21, 1997

[51] Int. Cl.⁶ ............................ B65B 13/18; A01F 15/07
[52] U.S. Cl. .................................. 100/5; 56/341; 100/13
[58] Field of Search ................................ 100/5, 13, 18; 56/341

[56] References Cited

U.S. PATENT DOCUMENTS

| | | | |
|---|---|---|---|
| 2,971,455 | 2/1961 | Wade et al. | 100/5 |
| 3,894,484 | 7/1975 | Anstey et al. | 100/5 |
| 3,988,977 | 11/1976 | Anderson | 100/5 |
| 4,024,804 | 5/1977 | Hanson | 100/5 |
| 4,169,410 | 10/1979 | Richardson | 100/5 |
| 4,174,661 | 11/1979 | Mathes et al. | 100/5 |
| 4,248,143 | 2/1981 | Gaeddert | 100/5 |
| 4,306,494 | 12/1981 | Nishibe et al. | 100/5 |
| 4,440,075 | 4/1984 | Gaeddert | 100/5 |
| 4,530,279 | 7/1985 | Walker | 100/5 |
| 4,557,189 | 12/1985 | Schaible | 100/5 |
| 4,627,340 | 12/1986 | Glass et al. | 100/5 |
| 4,649,812 | 3/1987 | Mouret | 100/5 |
| 4,793,249 | 12/1988 | Wellman . | |
| 4,800,811 | 1/1989 | Wellman | 100/5 |
| 4,885,990 | 12/1989 | Mouret | 100/5 |
| 5,054,387 | 10/1991 | Diederich, Jr. et al. | 100/5 |
| 5,170,701 | 12/1992 | Viaud . | |
| 5,349,806 | 9/1994 | Swearingen et al. . | |
| 5,437,226 | 8/1995 | Wagstaff | 100/5 |
| 5,450,787 | 9/1995 | Horchler . | |
| 5,465,658 | 11/1995 | Wagstaff et al. . | |

FOREIGN PATENT DOCUMENTS

| | | | |
|---|---|---|---|
| 0041444 | 12/1981 | European Pat. Off. | 100/5 |
| 0085817 | 8/1983 | European Pat. Off. | 100/5 |
| 2620807 | 11/1977 | Germany . | |
| 2150073 | 6/1985 | United Kingdom | 100/5 |

*Primary Examiner*—Stephen F. Gerrity
*Attorney, Agent, or Firm*—Hovey, Williams, Timmons & Collins

[57] ABSTRACT

A round baler having a wrapping apparatus for wrapping bales with twine includes a twine dispenser moveable generally between the sidewalls for dispensing at least one strand of twine around the bale. The wrapping apparatus includes a retractable twine guide for spacing the twine wrapped around the bale a certain distance from one of the sidewalls. The guide is shiftable into and out of an operating position, in which the guide engages and maintains the twine the distance from the one sidewall. The wrapping apparatus further includes a twine cutter for severing the twine at the end of each wrapping cycle. Power mechanism, such as a hydraulic cylinder, is provided for simultaneously operating the twine cutter and the twine guide.

15 Claims, 12 Drawing Sheets

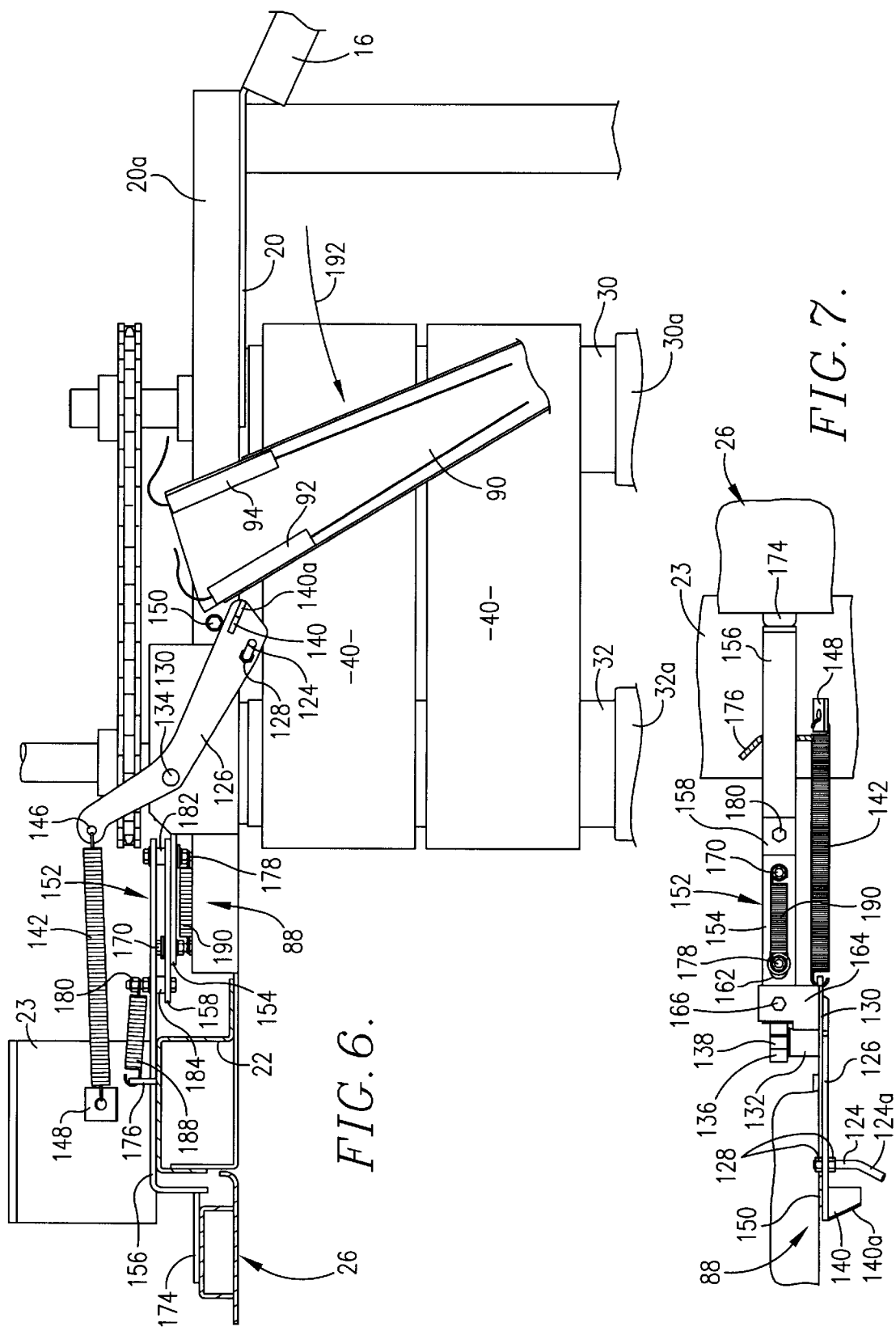

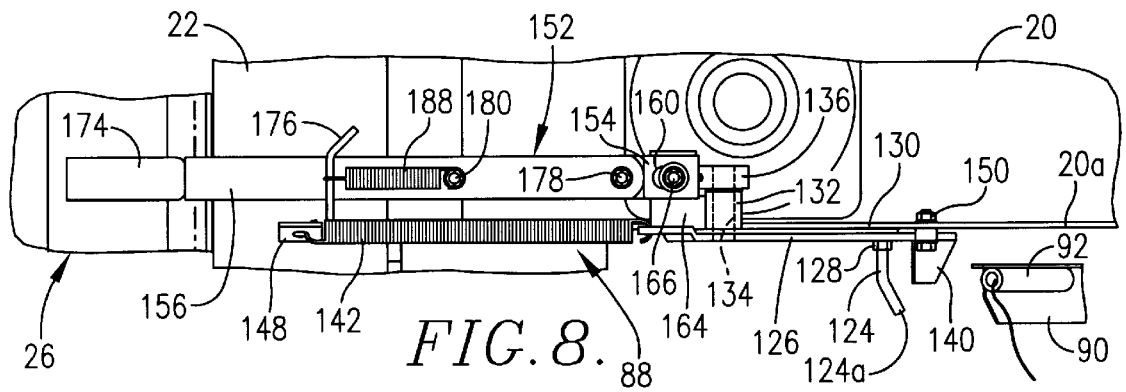
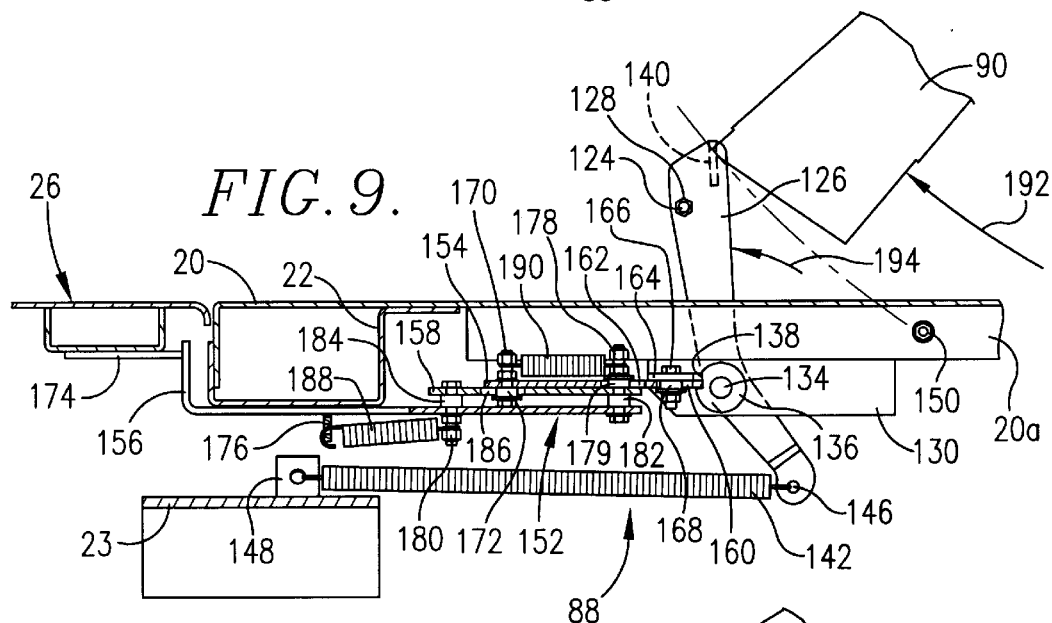
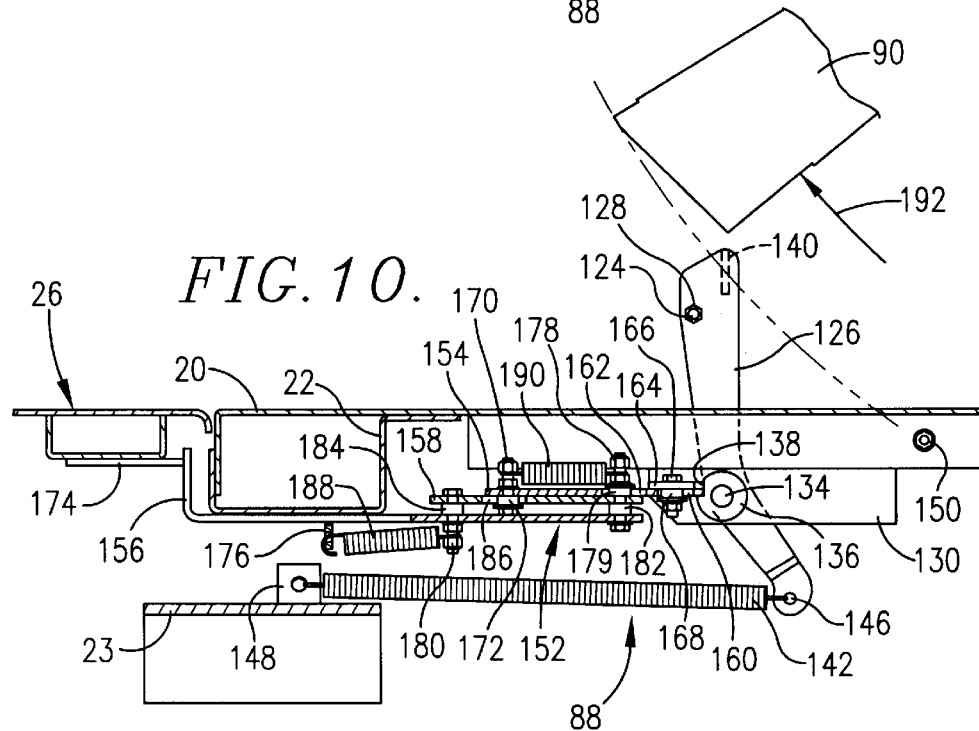

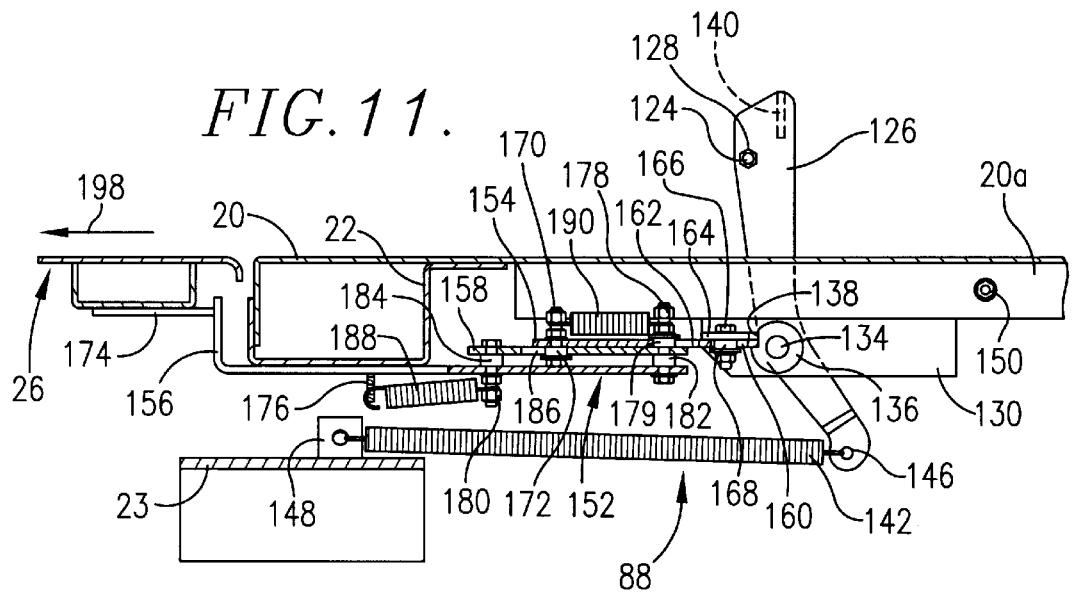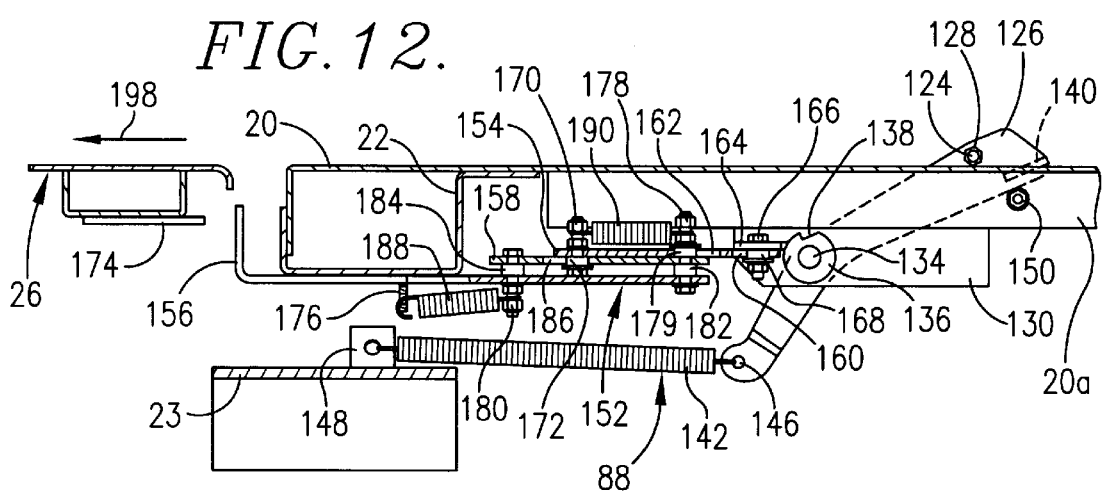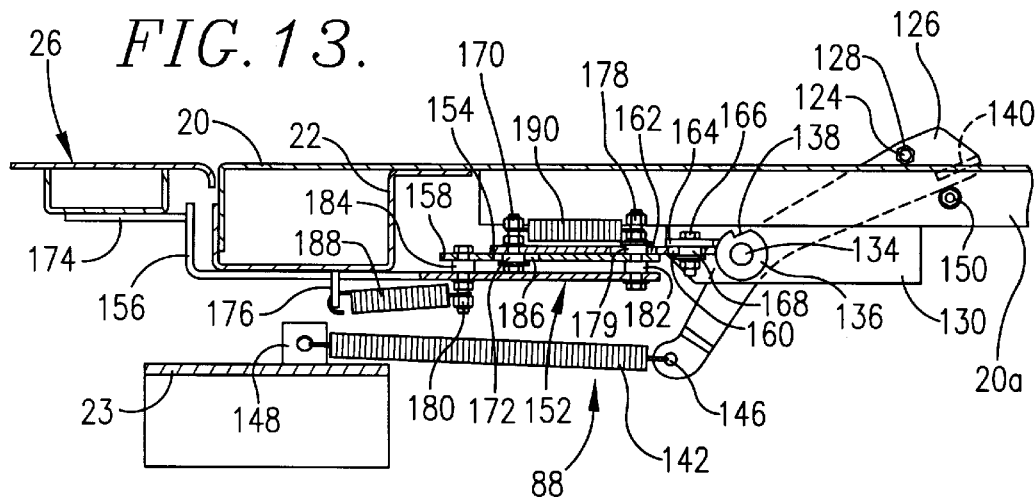

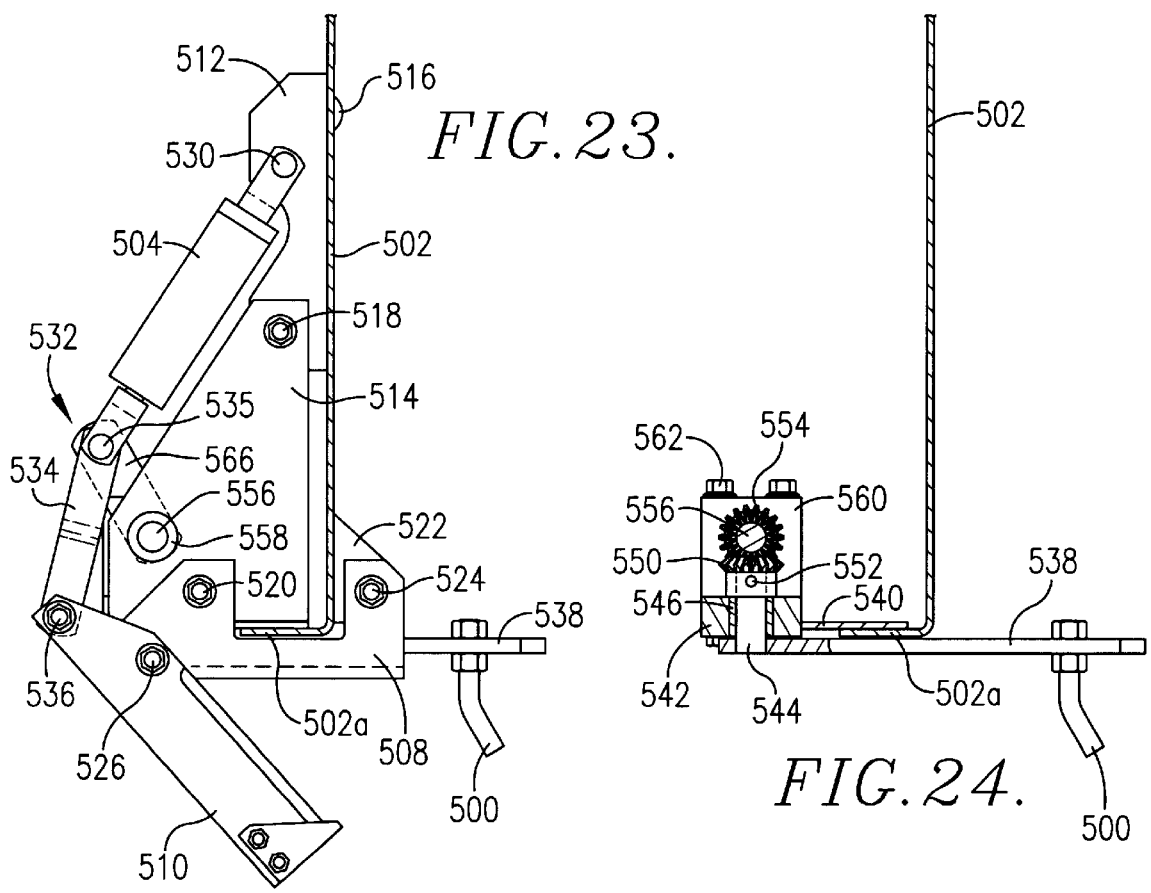
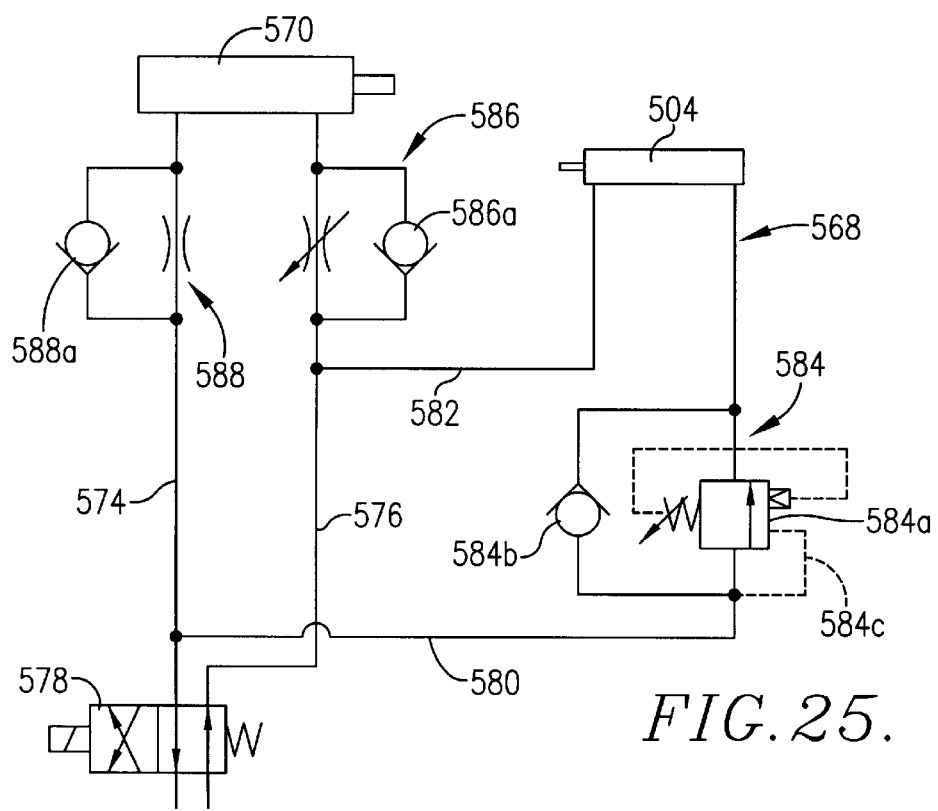

END OF ROUND BALE TWINE GUIDE

BACKGROUND OF THE INVENTION

1. Field of the Invention

The present invention relates generally to round balers utilizing twine for wrapping successively formed bales and, more particularly, to a retractable twine guide for spacing the twine wrapped around the bale a certain distance from one of the sidewalls of the baler.

2. Discussion of Prior Art

Round balers of both the fixed and variable chamber varieties often utilize strands of twine to wrap a fully formed bale. However, it is a well recognized problem with such conventional balers that twine wrapped around the extreme ends of the bale adjacent the sidewalls of the baler tends to slip off the bale. As those of ordinary skill in the art will appreciate, this problem is attributable to various factors such as the decreased crop material density at the ends of the bale. The convolutions of twine wrapped around the relatively inadequately formed ends of the bale are susceptible to unwrapping or may simply separate from the bale as the bale is discharged, transported, etc. As those of ordinary skill in the art will further recognize, this problem is magnified in dry, crumbly hay conditions.

Detached convolutions of twine are troublesome for several reasons. For example, loose strands of twine are unsightly and obviously detrimental to the salability of the bale. Moreover, the ends of the bale tend to be insufficiently wrapped, allowing the bale to loosen and deteriorate, which is especially problematic when the bales are stacked.

Accordingly, twine guides have been provided for spacing twine wrapped around the bale a certain distance inwardly from the sidewalls of the baler to ensure the twine remains wrapped around the bale. However, conventional twine guides consist of stationary devices mounted to the sidewalls of the baler. Since a majority of balers utilize a twine dispenser in the form of one or more pivotal twine dispensing tubes which dispense twine within the inflow of crop material so that the material carries the twine into the baling chamber and around the bale, the twine guide is positioned between the dispensing tube and the baling chamber and generally within the path of the inflowing material. Consequently, stationary twine guides interfere with the flow of crop material and are prone to collecting crop material and trash thereon which inhibits their twine guiding function. As those of ordinary skill in the art will appreciate, conventional twine guides are particularly problematic in balers utilizing a wide pickup. Wide pickups transfer and converge a wide windrow of crop material into the baling chamber and traditionally employ structure that congests the area within which the dispensing tube and twine guide are positioned and, more importantly, deliver a relatively heavy flow of crop material adjacent the sides of the baler.

OBJECTS AND SUMMARY OF THE INVENTION

Responsive to these problems, an important object of the present invention is to provide a baler with structure for assuring that during the wrapping cycle of the machinery, the endmost wraps of twine are placed around the bale in such a manner that the wraps are prevented from separating from the ends of the bale. The present invention is particularly concerned with a twine guide for spacing the endmost wraps of twine from the end of the bale. Moreover, it is an object of the present invention to provide the baler with a twine guide that does not collect crop material or trash thereon so as to maintain the twine guiding function thereof. Another object of the present invention is to provide a twine guide which minimizes interference with the inflow of crop material. Additionally, an object of the present invention is to provide a twine guide that is particularly useful with balers having a wide pickup. Yet another object of the present invention is to provide a twine guide which is shiftable out of a twine guiding position so that interference with inflowing crop material and accumulation of crop material and trash on the guide is reduced.

In accordance with these and other objects evident from the following description of a preferred embodiment of the invention, the round baler includes a wrapping apparatus having a retractable twine guide for spacing twine wrapped around the bale a certain distance inwardly from one of the sidewalls. The twine guide is shiftable into and out of an operating position, in which the guide is disposed to engage and maintain the twine the distance from the one sidewall. The twine guide may be shifted to a standby position, which is spaced substantially out of the path of inflowing crop material so that the guide does not interfere with the flow of crop material and does not catch material and trash thereon.

In a first embodiment, a twine dispenser, which is moveable between the sidewalls during a wrapping cycle and rests in a home position adjacent the one sidewall between successive wrapping cycles, is operable for shifting the twine guide into its operating position. Preferably, the guiding apparatus includes an arm pivotal toward and away from the one sidewall for carrying the twine guide between its standby and operating positions. The twine guide is positioned adjacent an inboard end of the arm such that the arm projects inwardly beyond the one sidewall when the guide is in the operating position. Preferably, the dispenser releasably engages the arm as the dispenser moves out of the home position for shifting the guide from the standby position to the operating position. If desired, the arm includes a tang configured for releasable engagement with the dispenser as the dispenser moves out of the home position.

The first embodiment further preferably includes a latching mechanism operably coupled with the arm for releasably retaining the guide in its operating position when the mechanism is actuated. A return tension spring is connected between the arm and the one sidewall for yieldably biasing the guide into the standby position such that the guide shifts from the operating position to the standby position when the latching mechanism is deactuated. A stop is positioned for engagement with the arm when the guide is in the standby position for preventing the return spring from shifting the guide beyond the standby position.

The preferred latching mechanism is disposed for operation by the tailgate, wherein the mechanism is actuated as the tailgate swings into the closed position and is allowed to deactuate as the tailgate swings out of the closed position. The latching mechanism includes a shiftable connecting bar positioned for releasable engagement with the tailgate as the tailgate swings into and out of the closed position. The tailgate engages the bar as the tailgate swings into the closed position for shifting the bar in a first direction, thereby actuating the latching mechanism, and disengaging the bar as the tailgate swings out of the closed position for allowing the bar to shift in the opposite direction, thereby deactuating the latching mechanism. The latching mechanism includes structure for deactuating the latching mechanism as the tailgate swings out of the closed position, preferably in the form of a tension spring connected between the bar and the one sidewall.

Preferably, the arm has a portion with a notch defined therein, while the latching mechanism includes a shiftable latch element configured for complemental latching interengagement with the notch, when the guide is in the operating position and the latching mechanism is actuated. The portion includes a disk coaxial with the pivot axis of the arm such that pivoting of the arm causes rotation of the disk. The disk presents a substantially cylindrical marginal surface within which the notch is defined. The latch element and the bar are coupled for allowing limited relative movement therebetween so that when the latching mechanism is actuated the latch element is allowed to shift relative to the bar. Accordingly, the latching mechanism includes a tension spring coupled between the bar and the latch element for yieldably biasing the latch element against the portion of the arm when the mechanism is actuated so that the latch element yieldably presses against the marginal surface, as the twine guide shifts from the standby position toward the operating position, and shifts into latching interengagement with the notch once the guide reaches the operating position.

In a second embodiment, the wrapping apparatus includes recoil structure for yieldably biasing the twine guide into the operating position. In this respect, the twine guide may be positioned generally within the path of the inflowing crop material when the guide is in the operating position, such that crop material engaging the guide shifts the guide out of the operating position against the bias of the recoil structure. The wrapping apparatus includes a shiftable support member, in the form of an elongated rod, for carrying the twine guide into and out of the operating position. The rod is slidably received within a first cylindrically shaped, tubular sleeve member that is fixedly connected to the one sidewall. In this respect, longitudinal shifting of the rod relative to the sleeve allows for adjustment of the distance the twine guide spaces the twine from the one sidewall, while rotational shifting of the rod within the sleeve allows for shifting of the twine guide into and out of the operating position.

The wrapping apparatus of the second embodiment further includes structure for securing the rod in longitudinally spaced positions relative to the first sleeve member. Preferably, the wrapping apparatus includes a second cylindrically shaped, tubular sleeve member slidably receiving the rod and a stationary retainer spaced from the first sleeve member, with the second sleeve member being disposed therebetween. The second sleeve member has a pair of diametrically opposed openings and the rod has a plurality of longitudinally spaced diametrical through-holes which may be selectively aligned with the openings of the sleeve. A pin is removably received within the openings and one of the through-holes for preventing longitudinal shifting of the rod relative to the second sleeve member and for releasably coupling the second sleeve member with the rod for rotational movement therewith.

A third embodiment concerns the use of a power mechanism, such as a hydraulic piston and cylinder assembly, for shifting the twine guide into and out of its operating position. The assembly is preferably connected between the twine cutter and the arm carrying the twine guide such that the assembly controls operation of the cutter and the twine guide. A sequencing circuit is provided for fluidly connecting the assembly and the piston and cylinder unit for the twine dispenser to a common source of hydraulic pressure. The sequencing circuit controls fluid flow to the assembly and the unit during the wrapping cycle so that the cutter shifts to its cutting position and the twine guide shifts out of its operating position once the dispenser reaches its home position. Additionally, because the dispenser is preferably configured to swing through the blades of the cutter, the sequencing circuit is also designed to open the cutter and shift the twine guide to the operating position before the dispenser passes the cutter.

A fourth embodiment also concerns the use of a power mechanism, such as a hydraulic piston and cylinder assembly, for shifting the twine guide into and out of its operating position. However, this embodiment includes structure for operably connecting the twine guide and the twine cutter to the same end of the assembly, with the opposite end of the assembly being anchored to the sidewall of the baler. This construction is simple yet ensures simultaneous shifting of the twine guide and twine cutter. A simplified sequencing circuit is provided for fluidly connecting the assembly and the piston and cylinder unit of the twine dispenser to a common source of hydraulic pressure. Operation of this embodiment of the wrapping apparatus is similar to the third embodiment, however, shifting of the twine cutter and twine guide are simultaneous rather than sequential, as is possible with the third embodiment.

BRIEF DESCRIPTION OF THE DRAWING FIGURES

A preferred embodiment of the invention is described in detail below with reference to the attached drawing figures, wherein:

FIG. 1 is a fragmentary, side elevational view of a round baler employing a twine guide constructed in accordance with the present invention, particularly illustrating the components of the wrapping apparatus disposed exteriorly of the right sidewall of the baler, FIG. 2 is an enlarged, fragmentary, side elevational view of the lower portion of the baler illustrated in FIG. 1, again illustrating the components of the wrapping apparatus disposed exteriorly of the right sidewall of the baler;

FIG. 6 is an enlarged, fragmentary, bottom view of the right side of the baler, particularly illustrating the twine dispenser as it pivots out of a home position and into engagement with the support arm carrying the twine guide;

FIG. 7 is an enlarged, fragmentary, side elevational view taken from inside the right side of the baler and looking toward the inside surface of the right sidewall, particularly illustrating the twine guide in the operating position, the tailgate in a closed position, and the latching mechanism in an actuated condition as a result of the tailgate being in a closed position;

FIG. 8 is an enlarged, fragmentary, side elevational view similar to FIG. 7, but with the view being taken from outside the baler and looking forward the outside surface of the right sidewall;

Figure 14:
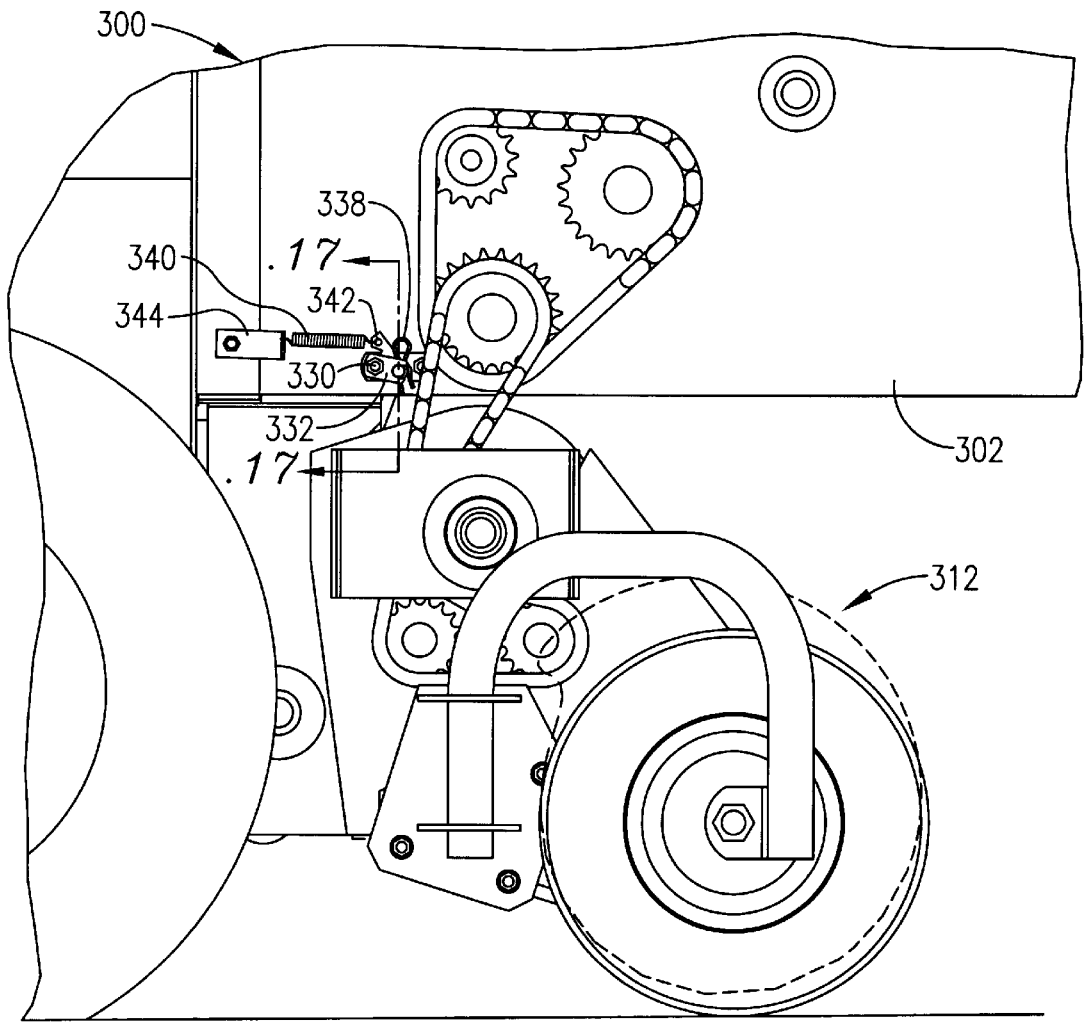
Figure 15:
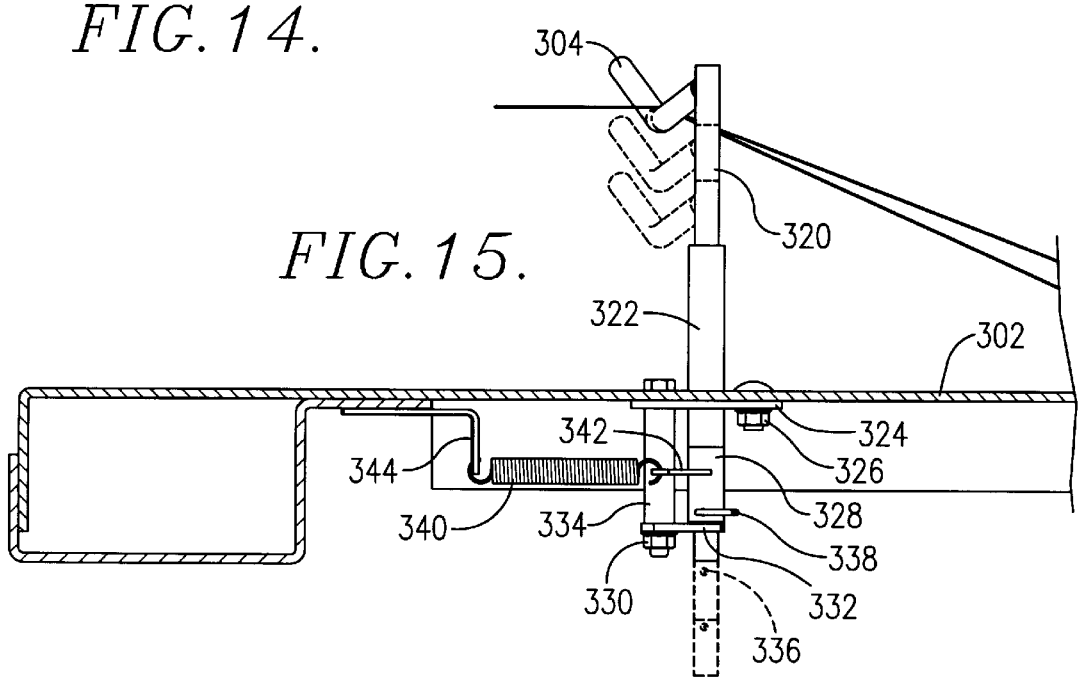
Figure 16:
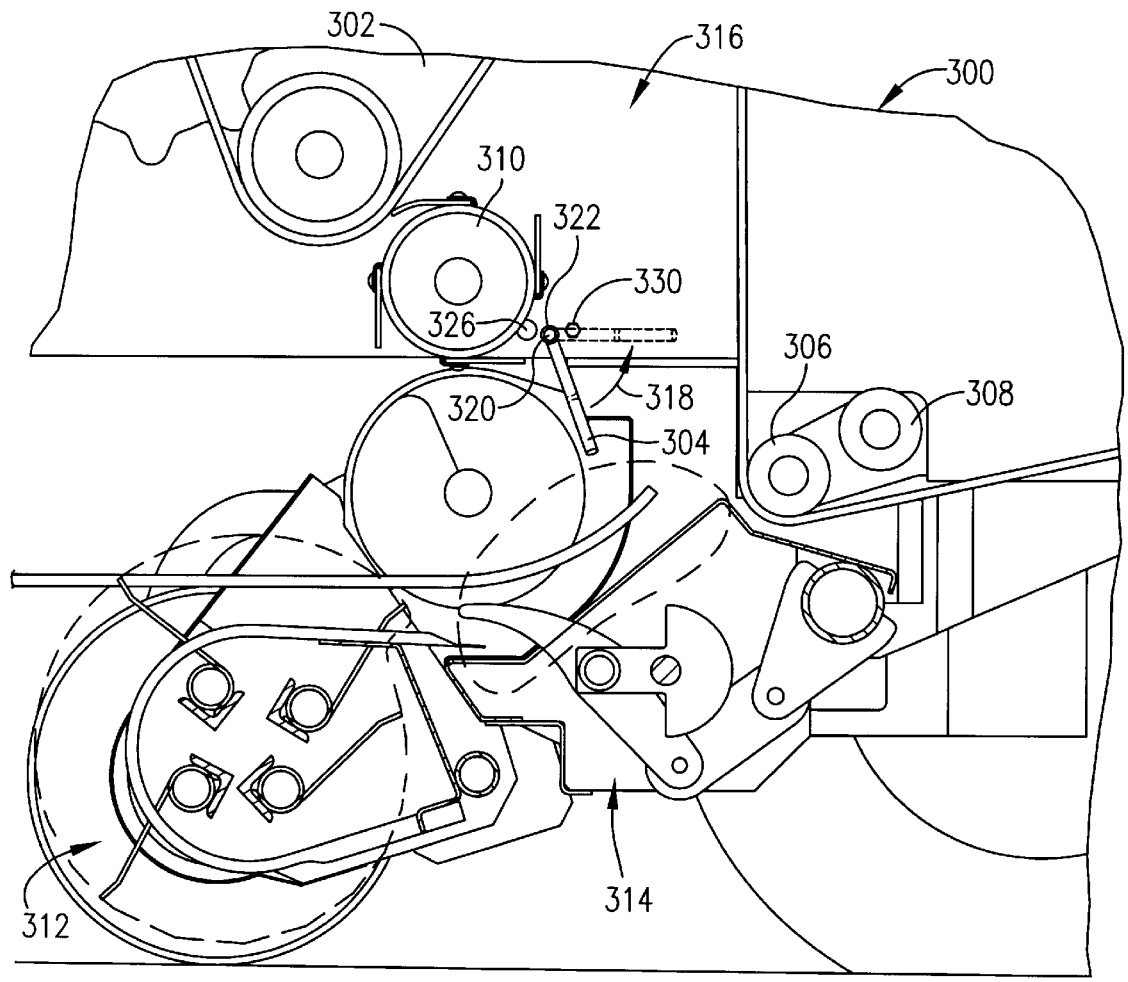
Figure 17:
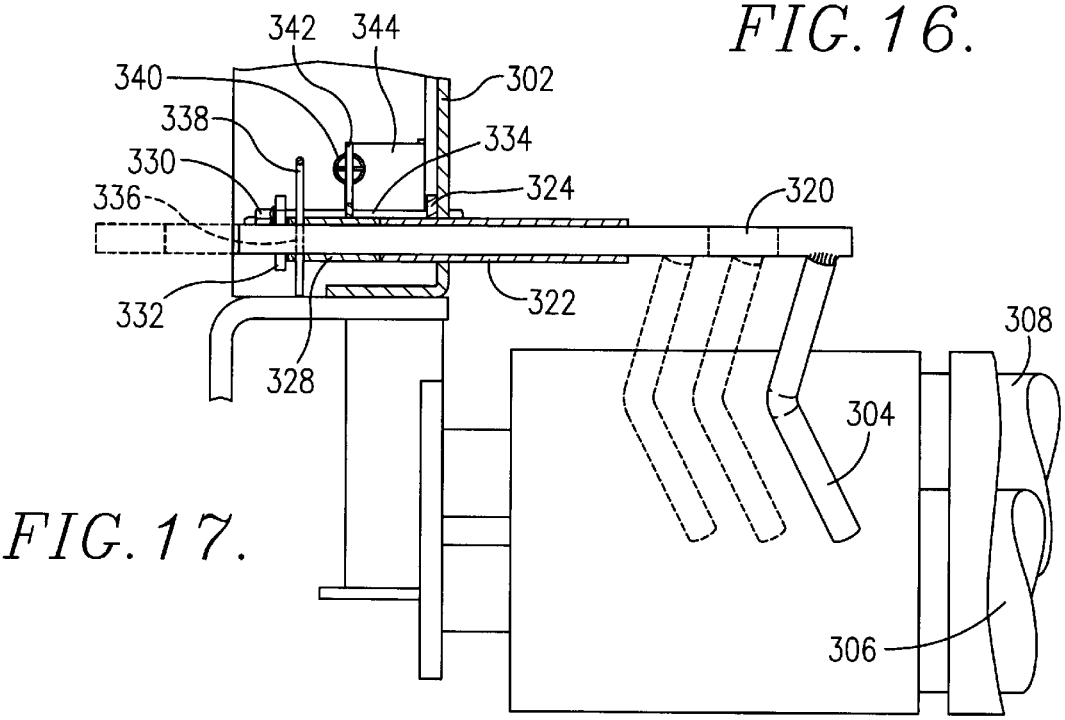
Figure 19:
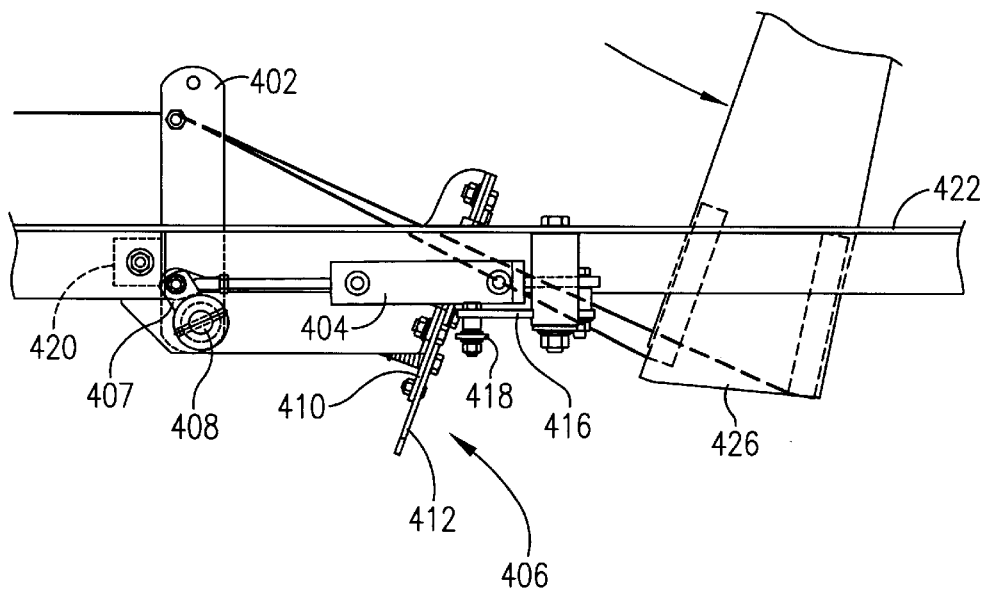
Figure 18:
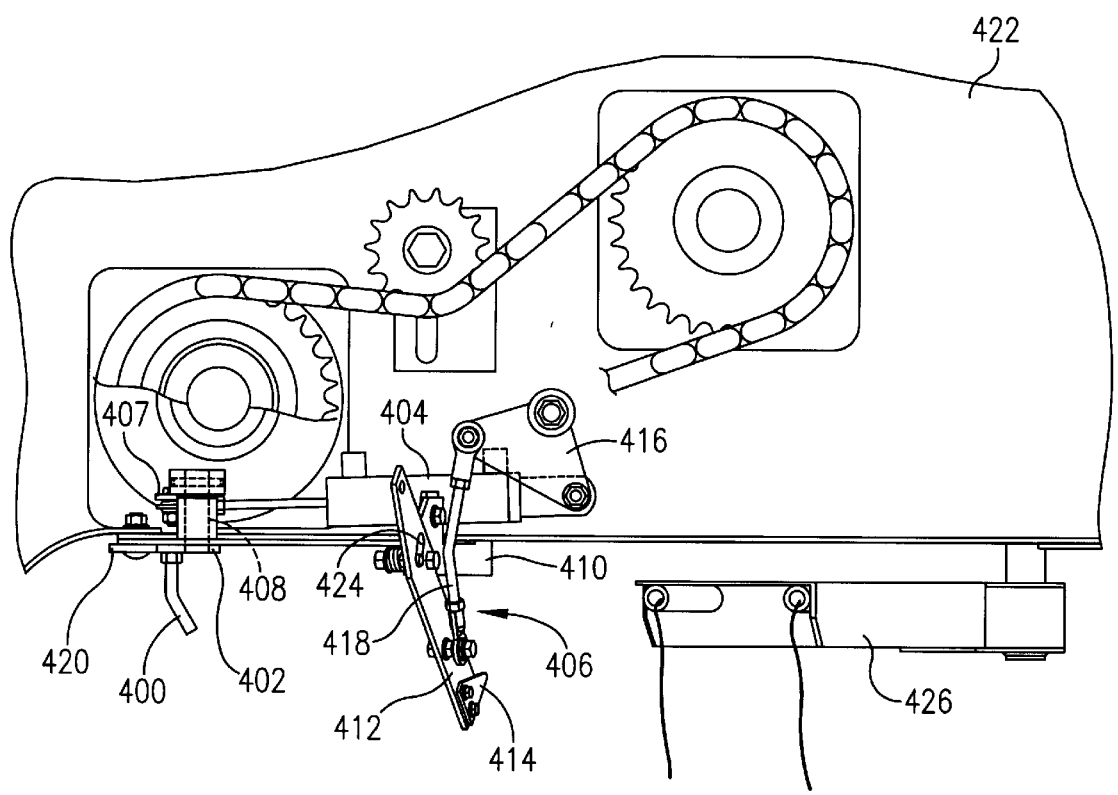
Figure 20:
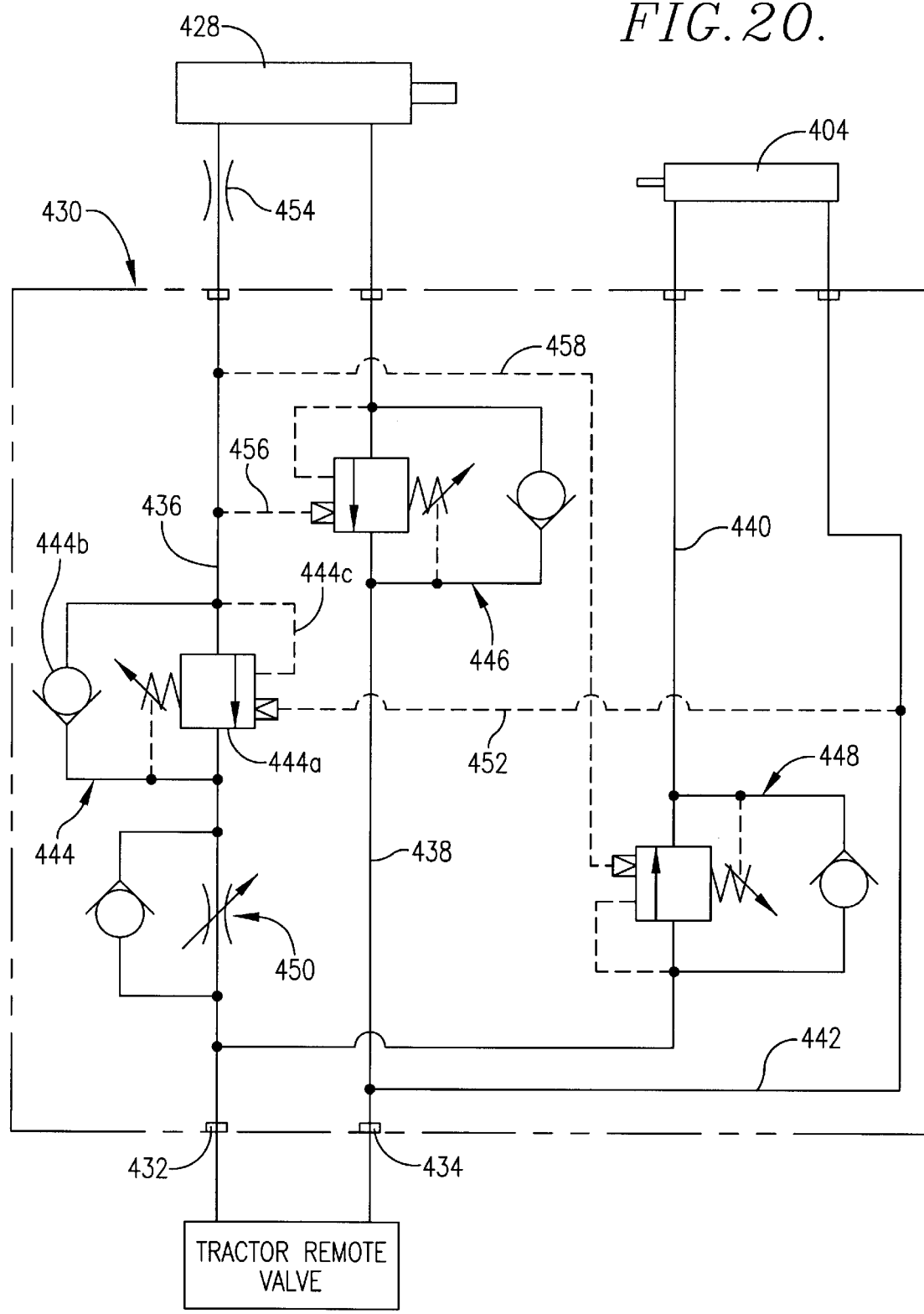
Figure 22:
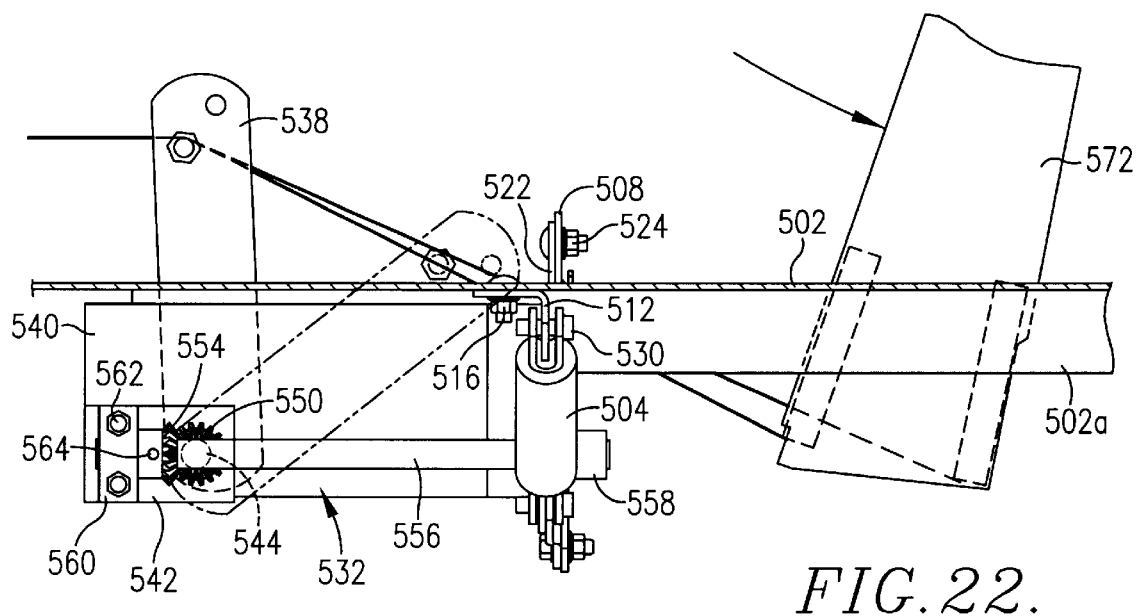
Figure 21:
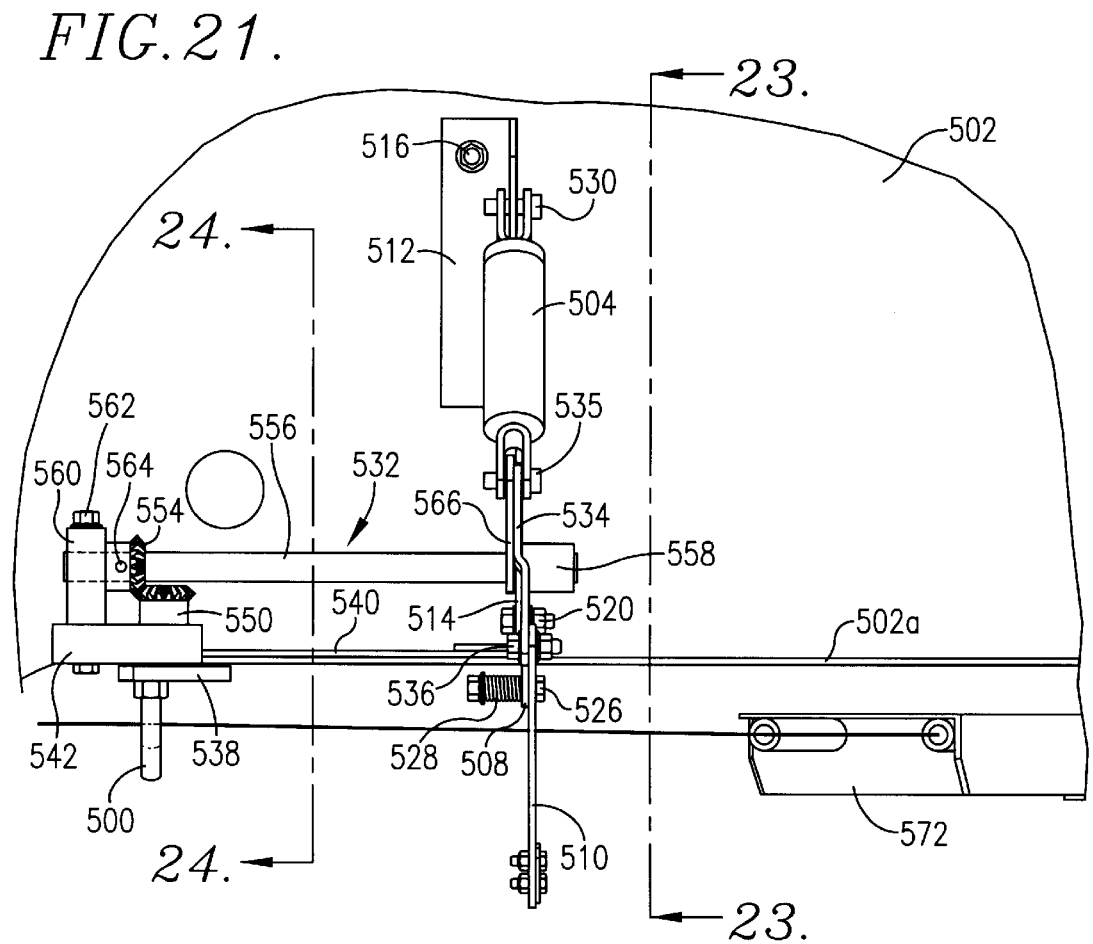

FIG. 9 is an enlarged, fragmentary, top plan view of a portion of the right side of the baler, particularly illustrating the tailgate in the closed position, the latching mechanism responsively in the actuated condition, the twine guide in the operating position, and the interengagement of the twine dispenser and the support arm after the twine dispenser pivots out of the home position to shift the twine guide into the operating position;

FIG. 10 is an enlarged, fragmentary, top plan view similar to FIG. 9, but illustrating the twine dispenser as it pivots beyond the twine guide, FIG. 11 is an enlarged, fragmentary, top plan view of a portion of the right side of the baler, particularly illustrating the tailgate slightly ajar as it swings out of the closed position, the latching mechanism as it deactuates in response to raising of the tailgate, and the twine guide in the operating position;

FIG. 12 is an enlarged, fragmentary, top plan view similar to FIG. 11, but illustrating the tailgate raised slightly further than as depicted in FIG. 11, the tailgate disengaged from the latching mechanism such that the mechanism is deactuated, and the twine guide returned to its standby position;

FIG. 13 is an enlarged, fragmentary, top plan view similar to FIG. 12, but illustrating the tailgate in the closed position, the latching mechanism responsively in the actuated condition, and the twine guide in the standby position;

FIG. 14 is an enlarged, fragmentary, side elevational view of a lower portion of a baler employing a second embodiment of the present invention, particularly illustrating the components of the wrapping apparatus disposed exteriorly of the right sidewall of the baler;

FIG. 15 is an enlarged, fragmentary, top plan view of a portion of the right side of the baler illustrated in FIG. 14, particularly illustrating the various operating positions of the twine guide spaced inwardly from the right sidewall;

FIG. 16 is an enlarged, fragmentary, side elevational view inside the lower portion of the baler illustrated in FIG. 14, particularly illustrating internal details of construction of the baler and showing in full lines the twine guide in the operating position;

FIG. 17 is a vertical sectional view taken along line 17—17 in FIG. 14;

FIG. 18 is an enlarged, fragmentary, side elevational view of a baler employing a third embodiment of the present invention, particularly illustrating the components of the wrapping apparatus disposed exteriorly of the right sidewall of the baler;

FIG. 19 is an enlarged, fragmentary, top plan view of the right side of the baler, particularly illustrating the twine guide in the operating position and the dispenser as it returns to its home position;

FIG. 20 is a schematic diagram of the hydraulic sequencing circuit interconnecting the hydraulic cylinders for the twine dispenser and for the twine guide and twine cutter with a common source of hydraulic pressure;

FIG. 21 is an enlarged, fragmentary, side elevational view of the right side of a baler employing a fourth embodiment of the present invention, particularly illustrating the components of the baler wrapping apparatus disposed exteriorly of the right sidewall of the baler;

FIG. 22 is a horizontal cross-sectional view taken above the wrapping apparatus shown in FIG. 21, particularly showing in solid lines the twine guide in an operating position and in phantom lines the twine guide in a retracted, standby position;

FIG. 23 is an enlarged, fragmentary, vertical cross-sectional view taken along line 23—23 in FIG. 21, particu- larly illustrating the piston and cylinder assembly retracted with the swingable blade of the twine cutter in an open position;

FIG. 24 is an enlarged, fragmentary, vertical cross-sectional view taken along line 24—24 of FIG. 21; and FIG. 25 is a schematic diagram of the hydraulic sequencing circuit connecting the hydraulic cylinders for the twine dispenser and for the twine cutter and twine guide to a common source of hydraulic pressure.

DETAILED DESCRIPTION OF THE PREFERRED EMBODIMENTS

Figure 1:
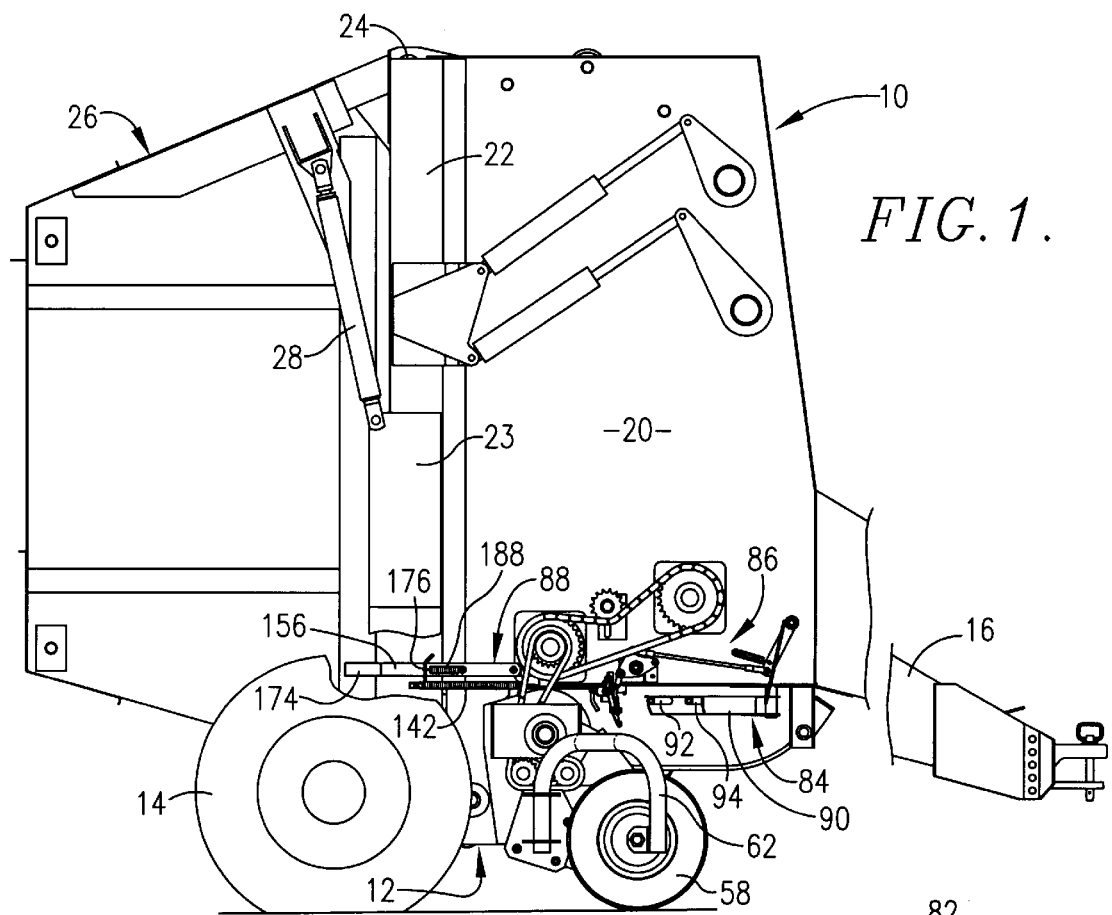

Turning initially to FIG. 1, the round baler 10 selected for illustration generally includes a chassis or frame 12 having ground wheels 14 and a forwardly extending tongue 16 that is adapted for connection with a towing vehicle (not shown). The chassis 12 carries a pair of upright, laterally spaced sidewalls 18 and 20 (see also FIG. 4) which cooperate to define a space within which bale forming and bale wrapping operations may be carried out as the baler is advanced across a field. A pair of left and right frame members extend upwardly from the chassis 12 (only the right frame member 23 disposed exteriorly of the right sidewall 20 being illustrated) to assist with supporting the sidewalls 18 and 20 in their upright disposition. Within the space defined by the sidewalls 18 and 20, the baler 10 further includes bale forming mechanism for compacting and rolling crop material into a round bale.

The sidewalls 18,20 present stationary forward portions fixed to the chassis 12 by suitable means and rearward portions swingably attached to the forward portions by an upper pivot assembly 24. The rearward portions of the sidewalls 18,20 cooperatively define a tailgate 26 which is swingable between an opened, discharge position (not shown), in which the tailgate 26 has sufficiently raised to allow a completely formed bale to be discharged from the baler 10, and a closed, baling position (FIG. 1), in which bale forming and wrapping operations are performed. A hydraulic cylinder 28 disposed exteriorly of each sidewall (only the cylinder corresponding with the right sidewall 20 being shown) is pivotally connected between the forward portion of the sidewall and the tailgate 26 for effecting such raising and lowering of the tailgate.

In the present embodiment, the bale forming mechanism and sidewalls 18,20 cooperate to define a so-called "variable chamber," belt-type machine, wherein the baling chamber is initially relatively small and then grows progressively larger as the bale increases in diameter within the baler 10. However, the principles of the present invention are equally applicable to various other baler constructions, such as fixed chamber balers. Although the bale forming mechanism is not illustrated or described in detail herein, it will be appreciated that the variable chamber baler includes a series of cooperating belts and rolls supported by the sidewalls 18,20 for rolling and compacting a bale as it forms within the baler 10. As those of ordinary skill in the art will appreciate, the baler 10 is provided with a plurality of laterally extending rolls, which include the pair of front and rear drive rolls 30 and 32, idler roll 34 and pair of tailgate-mounted rear inlet rolls 36,38 illustrated in FIG. 3. Furthermore, the rolls span the sidewalls 18,20 and are arranged in a generally circular pattern for guiding a plurality of endless, laterally spaced, side-by-side belts 40 as the belts 40 are driven linearly during bale formation and wrapping.

Figure 3:
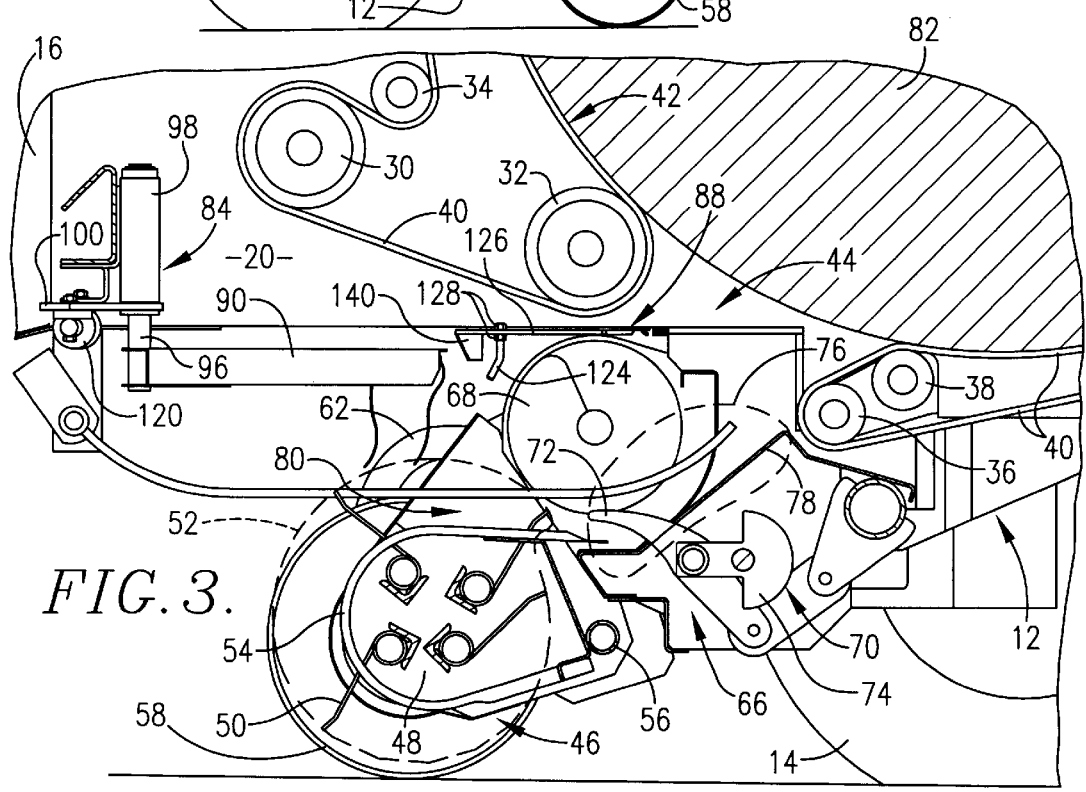
FIG. 3 is an enlarged, fragmentary, left side elevational view of the lower portion of the baler with the left sidewall removed, particularly illustrating internal details of construction of the baler, with the twine guide in a retracted, standby position.
Figure 4:
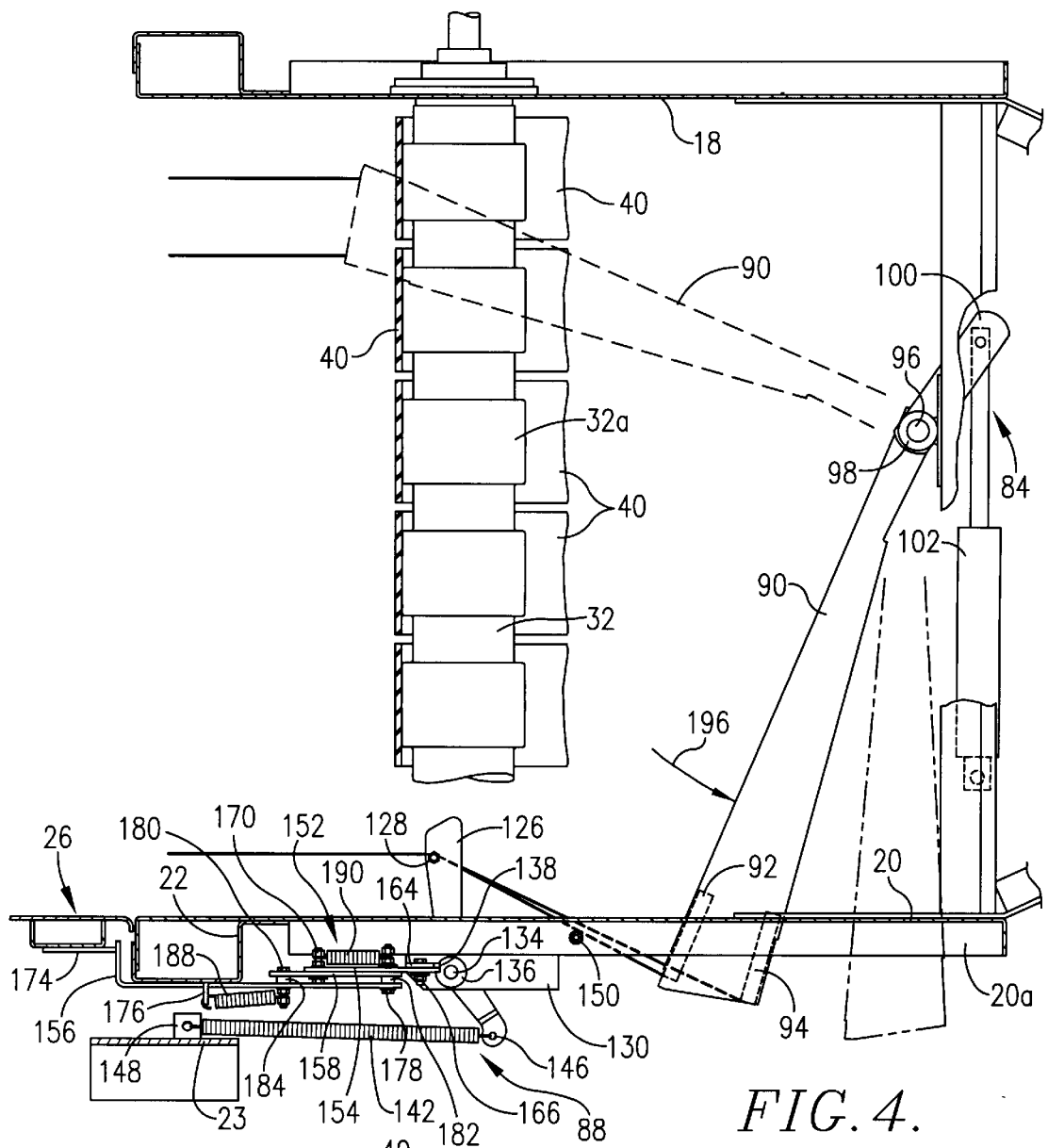
FIG. 4 is an enlarged, fragmentary, top plan view of the front of the baler, with parts being removed to illustrate the movement of the twine dispenser between the sidewalls and the twine guide in an operating position.
Figure 5:
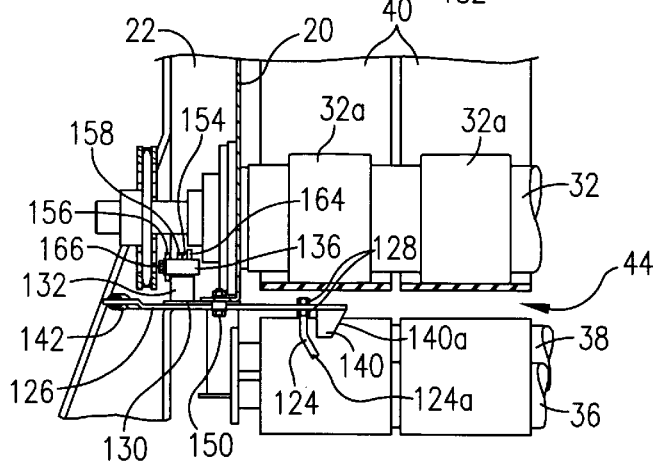
FIG. 5 is an enlarged, fragmentary, front elevational view of the right side of the baler, particularly illustrating the twine guide in the operating position.

The drive rolls 30 and 32 are drivingly coupled with the power source of the towing vehicle to drive the belts 40 and are driven in clockwise directions when viewing FIG. 3. Furthermore, as shown in FIGS. 4 and 5, the drive rolls 30,32 include a plurality of laterally spaced sleeves 32a (only the sleeves of the rear drive roll 32 being shown of) which each underlies a corresponding belt 40. The sleeves 32a are specially configured for reducing trash and crop material accumulation between the drive rolls 30,32 and belts 40. Furthermore, the sleeves 32a are the subject of the contemporaneously filed application for U.S. Letters Patent entitled TALL SLEEVES FOR ROUND BALER DRIVE ROLLS, in the names of J. Dale Anderson and LaVern Roy Goossen.

As perhaps best shown in FIG. 3, the belts 40 loop around the rear drive roll 32 and rear inlet rolls 36,38 to form a baling chamber 42 which is bounded at the sides by the sidewalls 18,20. Although not illustrated, it will be appreciated that the chamber 42 assumes an initial, generally upright configuration, but becomes distended and circular in transverse configuration as the bale grows beyond its initial starting core dimensions to assume the shape illustrated in FIG. 3. Furthermore, the chamber 42 is open at the bottom to present a crop infeed opening or crop inlet 44 that is defined between the rear drive roll 32 and the forwardmost rear inlet roll 36. It will be appreciated that the vertical and fore-and-aft spacing of the rear inlet rolls 36,38 provide an eased crop inlet configuration that has proven particularly effective in introducing crop material into the baling chamber 42. This eased inlet configuration is the subject of contemporaneously filed application for U.S. Letters Patent entitled EASED INLET TAILGATE ROLL ARRANGEMENT FOR VARIABLE CHAMBER ROUND BALER, in the names of Howard J. Ratzlaff, et al.

A wide crop pickup 46, supported by the chassis 12 generally below and forwardly of the crop infeed opening 44, is operable to lift crop material off the ground as the baler 10 is advanced across a field. In the present embodiment the pickup 46 projects laterally beyond the sidewalls 18,20 so that a large windrow that is wider than the baler may be delivered to the chamber 42. In short, the preferred pickup 46 includes a rotatable tine reel 48 having a plurality of tines 50 driven along a path, generally denoted by numeral 52 (FIG. 3), when the pickup reel 48 is rotated. The pickup 46 further includes a generally U-shaped wrapper 54 extending generally forwardly from the chassis 12 and having a plurality of laterally spaced slots (not shown) through which corresponding tines 50 project as the tines move upwardly and rearwardly along the path 52. The pickup can swing up and down about a transverse pivot 56 (FIG. 3) to the extent necessary for accommodating changes in ground contour sensed by a pair of left and right gauge wheels, 58 and 60 respectively, so as to maintain the elevation of the tine reel 48. The gauge wheels 58 and 60 are secured to the pickup 46 by special upwardly arched arms 62 and 64 respectively, such mounting arrangement for the gauge wheels 58,60 being the subject of contemporaneously filed application for U.S. Letters Patent entitled OVER-THE-TOP SUPPORT ARM FOR PICK-UP GAUGE WHEEL OF A BALER, in the names J. Dale Anderson and LaVern R. Goossen.

As the crop material is picked up off the ground, it flows generally rearwardly along the outer surface of the wrapper 54 toward a transfer mechanism, generally denoted by the numeral 66, which serves to centralize the flow of crop material from the wide pickup 46 and transfer it to the infeed opening 44. The transfer mechanism 66 preferably includes a pair of center-gathering, left and right stub augers 68 (only one such auger being shown in FIG. 3). It will be appreciated that the augers 68 are driven to converge the flow of crop material to a width generally equal to the width of the baling chamber 42. A fork-type stuffer 70 having a plurality of laterally spaced prongs 72 is driven by a crank 74 to move the prongs along a path, generally denoted by the numeral 76 (FIG. 3), for transferring the converged flow of crop material rearwardly through the crop inlet 44 and into the chamber 42. An inclined ramp 78 positioned between the infeed opening 44 and the wrapper 54 of the pickup 46 has a plurality of laterally spaced slots (not shown), each configured for receiving a corresponding prong 72. As indicated by the path 76, the prongs 72 project through the slots of the ramp 78 as they shift rearwardly to move crop material along the ramp and into the crop inlet 44.

The pickup 46 and transfer mechanism 66 discussed hereinabove are disclosed in greater detail in contemporaneously filed application for U.S. Letters Patent entitled DOWN TURNING STUB AUGERS ON WIDE PICK-UP FOR ROUND BALERS, in the names of Howard J. Ratzlaff and J. Dale Anderson. As those of ordinary skill in the art will appreciate, a so-called "open throat" baler is illustrated in the drawings in view of the fact that the throat area, generally referenced by the number 80 and leading from the front of the pickup 46 to the baling chamber 42, is completely open and unobstructed, without the presence of compression rollers or the like.

As crop material is delivered to the baling chamber 42 by the pickup 46 and transfer mechanism 66, the bale forming mechanism operates in the usual manner during a baling cycle to form a full size bale, which is denoted by the numeral 82 in FIG.3. Upon completion of the baling cycle, it is necessary to wrap the bale 82 before the tailgate 26 is raised to discharge the bale from the chamber 42, and accordingly, a wrapping mechanism is provided on the baler 10 for wrapping successively formed bales with strands of twine. The wrapping mechanism generally includes a twine dispensing assembly 84 (FIGS. 3–4) for dispensing at least one strand of twine around the bale 82 during the wrapping cycle, a twine cutting assembly 86 (FIG. 2) for cutting the strand(s) of twine upon completion of the wrapping cycle, and a twine guiding assembly 88 (FIGS. 2 and 4) for spacing the strand(s) of twine inwardly a distance from the right sidewall 20 to prevent twine from wrapping around the right end of the bale 82.

The preferred twine dispensing assembly 84 includes a "double-barrel" twine dispenser 90 having a pair of tubes 92,94 adjacent the distal end thereof for dispensing two separate strands of twine around the bale 82; although it is entirely within the ambit of the present invention to utilize a dispenser which dispenses only a single strand of twine. The proximal end of the dispenser 90 is attached to a shaft 96 rotatably carried within a bearing sleeve 98, which cooperatively support the dispenser for generally horizontal, pivotal movement between the sidewalls 18,20. A crank 100 is also attached to the rotatable shaft 96 in a generally radially opposed orientation to the dispenser 90. As shown in FIG. 3, the distal end of the crank 100 is pivotally connected with a double-acting hydraulic cylinder 102, such that extension and retraction of the cylinder imparts pivotal movement to the dispenser 90.

It will be appreciated that the dispenser 90 rests in a home position between successive wrapping cycles, wherein the dispenser is disposed generally transverse to the fore-and-aft axis of the baler 10 with the free end thereof projecting beyond the right sidewall 20 (shown with phantom lines in FIG. 4). A wrapping cycle may be initiated automatically by various sensors, such as position sensors which sense the position of moveable rolls (not shown) corresponding to a full size bale, or manually by the operator. Under any circumstances, the wrapping cycle involves supplying hydraulic fluid to the rod end of the cylinder 102 so that the cylinder retracts, thereby swinging the dispenser 90 out of the home position and toward the left sidewall 18. Retraction of the cylinder 102 continues until the dispenser 90 has reached a desired remote position (shown with dashed lines in FIG. 4), which is sufficiently spaced from the left sidewall 18 to dispense twine so that the left half of the bale 82 is adequately wrapped, without wrapping the left end of the bale. Of course, the remote position may be adjustably shifted toward or away from the left sidewall (i.e., the operator may adjust the degree of pivoting of the dispenser 90) by varying the amount of hydraulic fluid supplied to the cylinder 102, or connecting the cylinder 102 to the crank 100 at a position spaced closer to or further from the shaft 96. Once the dispenser 90 has pivoted into the remote position, the flow of hydraulic fluid is reversed so that the cylinder 102 extends, thereby pivoting the dispenser 90 toward the right sidewall 20. In the preferred embodiment, the dispenser 90 makes only two passes between the sidewalls 18,20 during a wrapping cycle, pivoting from the home position to the remote position and then returning to the home position.

Figure 2:
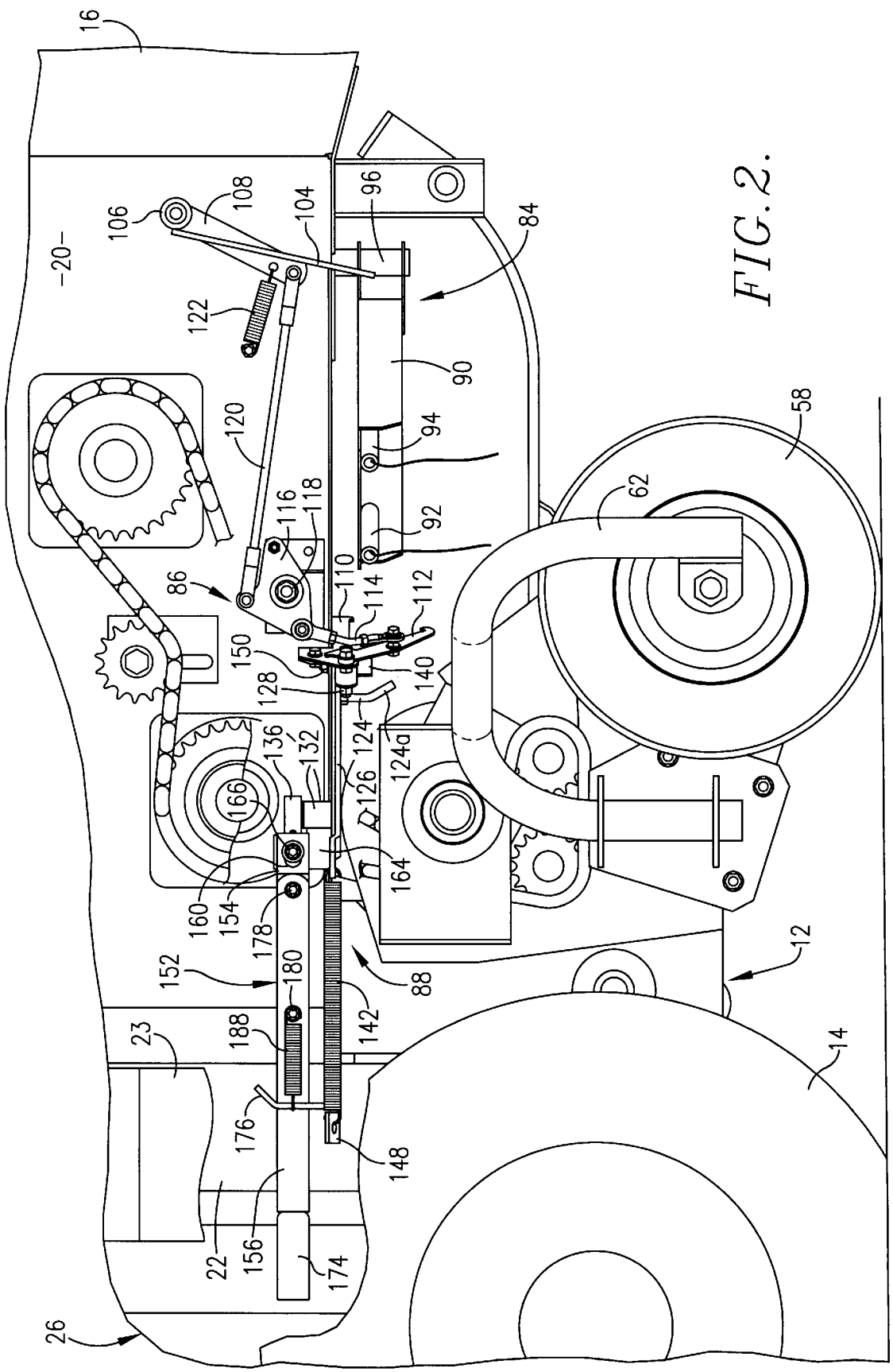

As indicated above, the preferred dispenser 90 includes a pair of tubes 92,94 for dispensing two individual strands of twine around the bale 82. Accordingly, a pair of twine balls (not shown) are stored within the baler 10 for supplying twine to the respective tubes 92 or 94. As will be indicated below, the twine cutting assembly 86 is configured for cutting the twine after a wrapping cycle so that the individual twine strands dangle freely from the respective tubes 92 or 94 (FIGS. 2 and 3). Accordingly, as the dispenser 90 initially swings out of the home position, the dangling ends of the twine strands are placed within the open throat 80 and, more importantly, within the path of inflowing crop material such that the material pulls the twine strands into the baling chamber and around the bale 82 as the dispenser pivots between the sidewalls 18,20.

Turning particularly to FIG. 2, it is necessary to sever the strands of twine once the wrapping cycle has completed, and accordingly, the twine cutting assembly 86 is disposed for operation by the dispenser 90 to cut the twine as the dispenser returns to the home position. The preferred cutting assembly 86 includes an operating lever 104 disposed exteriorly of the right sidewall for temporary operating connection with the dispenser 90 as the latter approaches the home position. The operating lever 104 is fixed to a rotatable sleeve 106 for swinging movement about a horizontal axis. Sleeve 106 also supports a connecting link 108, such that swinging movement of the lever 104 causes swinging movement of the link 108, and vice versa. The actual cutting mechanism preferably takes the form of a scissor-type cutter having an upper stationary blade 110 and a lower movable blade 112 that is swingable alongside the upper blade 110 and into cutting interengagement therewith. An angled rod 114 is connected between the lower blade 112 and a bell crank 116 for imparting swinging movement to the lower blade 112 as the crank 116 rotates about bolt assembly 118. An adjustable turnbuckle 120 is pivotally coupled between the bell crank 116 and the connecting link 108, whereby swinging of the operating lever 104 causes rotation of the crank 116. Finally, a tension spring 122 is connected between the right sidewall 20 of the baler 10 and the connecting link 108 for yieldably biasing the link 108 and operating lever 104 rearwardly (leftwardly viewing FIG. 2), which in turn biases the turnbuckle 120 leftwardly, the bell crank 116 in a counterclockwise direction (viewing FIG. 2) and the lower blade into the open position illustrated in FIG. 2.

Accordingly, as the dispenser 90 returns to its home position, it engages the operating lever 104 and swings the lever forwardly (rightwardly viewing FIG. 2) against the bias of spring 122. Furthermore, the strands of twine extending from the dispenser 90 into the baling chamber 42 are placed between the blades 110,112 of the cutting mechanism as the dispenser 90 pivots to the home position. The cutting assembly is configured so that once the dispenser 90 reaches its home position, the lower blade 112 has swung into cutting interengagement with the upper blade, thereby severing the twine disposed therebetween. It will be appreciated that the turnbuckle 120 may be lengthened or shortened by the operator to ensure this relationship exists. If desired, the operating lever 104 may be constructed as a leaf spring for preventing the dispenser 90 from excessively swinging the lever 104 and damaging the cutting assembly 86.

While the dispenser 90 rests in the home position between successive wrapping cycles, the blades 110,112 remain interengaged. However, at the beginning of each wrapping cycle, the dispenser 90 pivots out of the home position, performing the bias of spring 122 to swing the operating lever 104 rearwardly (leftwardly viewing FIG. 2). Eventually, the dispenser 90 disconnects from the operating lever 104 and the blades 110,112 remain in the open position, as depicted in FIG. 2, until the dispenser once again returns to the home position. In this respect, with the twine cutting assembly 86 disposed exteriorly of the right sidewall 20 and the dispenser 90 projecting beyond the sidewall 20 in the home position, the dangling strands of twine are not within the inflowing crop material during bale formation. In other words, the strands of twine are spaced outside the open throat 80 between successive wrapping cycles. Additionally, the blades 110,112 are spaced sufficiently away from the dispenser 90, when the dispenser is in its home position, to produce dangling strands of twine after severance thereof which are sufficiently long to be disposed within the path of inflowing crop material as the dispenser pivots from the home position to the remote position.

TWINE GUIDING ASSEMBLY 88

The twine guiding assembly 88 includes a retractable twine guide 124 for spacing end wraps of the twine a certain distance from the right sidewall 20, that is to say, the twine guide 124 prevents twine from wrapping around the right endmost extremity of the end of the bale 82. The twine guide 124 preferably consists of an angled rod having a lower hook section 124*a* which projects slightly inwardly when the guide is in an operating position (see FIG. 5) to catch the twine and ensure engagement therewith as the dispenser 90 pivots toward the right sidewall 20. The twine guide 124 is retractable in the sense that the guide is shiftable into and out of the operating position, in which the guide engages and maintains the strands of twine the aforementioned distance from the right sidewall 20. In the present embodiment, the twine guide 124 is also shiftable to a retracted, standby position (perhaps best shown in FIG. 6), in which the guide is disposed generally adjacent the sidewall 20. It will be appreciated that in the standby position, the twine guide 124 is disposed sufficiently out of the path of inflowing crop material to reduce interference with the crop material flow and accumulation of trash and material thereon.

A horizontally swingable guide arm 126 is provided for carrying the twine guide 124 between its operating and standby positions, with an upper threaded end of the guide 124 being secured to the arm 126 by locking fastener 128. The arm 126 is supported for such swinging movement by a support plate 130 attached to the underside of a generally horizontally, outwardly projecting lip 20a of the right sidewall 20 (FIG. 6). As specifically shown in FIG. 8, an upright, tubular sleeve 132 fixedly connected to the support plate 130 rotatably receives a pivot shaft 134 that projects downwardly through the plate 130 and connects with the arm 126, such that rotation of the shaft 134 corresponds with swinging of the arm 126. The shaft 134 also extends upwardly beyond the sleeve 132 for fixed reception within a disk 136, whereby rotation of the disk 136 also corresponds with swinging of the arm 126. The generally cylindrical peripheral surface of the disk has a notch 138 defined therein, the purposes of which will be described hereinbelow. Of course, the principles of the present invention are equally applicable to various other structure for carrying the twine guide between the operating and standby positions, such as a longitudinally shiftable arm.

The shaft 134 is connected to the arm 126 generally medially along the length thereof, with the twine guide 124 positioned adjacent the inboard end of the arm 126, such that the arm projects generally inwardly beyond the right sidewall 20 when the guide is in the operating position (FIG. 5), and lies substantially parallel to the right sidewall when the guide is in the standby position (FIG. 13). Adjacent the inboard end of the arm 126, a tang 140 depends downwardly from the underside of the arm. As best shown in FIG. 9, the tang 140 (illustrated in phantom) is configured for releasable, temporary engagement with the twine dispenser 90 as the latter pivots out of its home position, which, as will be further described hereinbelow, renders the dispenser 90 operable for shifting the twine guide 124 into the operating position. The tang 140 includes a downwardly tapering edge 140a which faces inwardly when the guide 124 is in its operating position (see FIG. 5). It will be appreciated that as the twine dispenser 90 pivots into its home position, twine engaging the edge 140a simply slips downwardly therealong and ultimately disengages the tang 140 so that the twine is engaged by the outwardly spaced twine guide 124.

As shown in FIG. 4, a return tension spring 142 is connected between the arm 126 and the relatively stationary baler frame member 23. Specifically, the arm 126 includes an opening 146 adjacent the outboard end thereof which receives an end of the spring 142, while an apertured bracket 148 welded to the member 23 connects with the other end of the spring. The return spring 142 yieldably biases the arm in the clockwise direction viewing FIG. 4 and therefore yieldably biases the twine guide 124 into the standby position (FIG. 6 and 13). A stop in the form of a bolt assembly 150 fastened to the lip 20a of the right sidewall is positioned for engagement with the arm 126 when the twine guide 124 is in the standby position (FIGS. 6 and 13) for preventing the return spring 142 from shifting the guide 124 beyond the standby position.

The twine guiding assembly 88 further includes a latching mechanism, generally denoted by the numeral 152, for releasably retaining the twine guide 124 in its operating position when the mechanism is actuated. As shown in FIG. 9, the mechanism 152 generally includes a latch bar 154 having a forwardmost end (rightwardmost end viewing FIG. 9) configured for complemental latching interengagement with the notch 138 in the disc 136 of arm 126, a relatively longer connecting bar 156 configured for releasable engagement with the tailgate 26 as the tailgate swings into and out of the closed position, and an intermediate bar 158 fixed to the connecting bar 156 for longitudinal shifting therewith.

Turning first to the latch bar 154, a pair of frontal (adjacent the right end of the bar viewing FIG. 9) and medial elongated slots, 160 and 162 respectively, are defined within the latch bar. An upright lug 164, attached to the support plate 130 by suitable means such as welding, supports a horizontal bolt assembly 166 having a brass bushing 168 that is slidably received within the frontal slot 160 for guiding and limiting longitudinal shifting of the latch bar. The latch bar 154 fixedly carries a horizontal bolt assembly 170 adjacent the rearwardmost end thereof (leftwardmost end of latch bar 154 viewing FIG. 9). For purposes which will be discussed below, the bolt assembly 170 includes a brass bushing 172.

The connecting bar 156 is generally L-shaped, with the relatively shorter leg thereof projecting generally transverse to the fore-and-aft axis of the baler 10 for ensuring engagement with the tailgate 26. A push plate 174 is attached to the tailgate 26 in a position for engaging the inturned shorter leg of the connecting bar 156 as the tailgate 26 swings into and out of the closed position. If desired, the push plate 174 may be adjustably attached to the tailgate 26 for further ensuring the operable engagement between the tailgate 26 and connecting rod 156. A support bracket 176 secured to the right sidewall 20 by suitable means such as welding includes an opening (not shown) configured for slidably receiving the connecting bar 156, thereby assisting with supporting the connecting bar in the illustrated disposition. A pair of front and rear bolt assemblies, 178 and 180 respectively, are fixed to the connecting bar 156, with the front bolt assembly 178 having a brass bushing slidably received within the medial slot 162 of the latch bar 154. Each of the bolt assemblies 178 and 180 include a respective spacer 182 and 184 for spacing the connecting bar 156 and intermediate bar 158 from one another.

The bolt assemblies 178,180 are also fixed to the intermediate bar 158 such that the intermediate bar 158 longitudinally shifts with the connecting bar 156, and vice versa. An elongated fore-and-aft slot 186 defined within the intermediate bar 158 slidably receives the brass bushing 172 associated with the latch bar 154.

The latching mechanism 152 includes a deactuating tension spring 188 connected between the rear bolt assembly 180 and the relatively stationary support bracket 176 for yieldably biasing the connecting bar 156 in the rearward direction (leftward viewing FIG. 9). As will be described hereinbelow, the deactuating spring 188 serves to deactuate the mechanism as the tailgate 26 raises out of the closed position so that the latch bar 154 withdraws from the notch 138, thereby allowing the return spring 142 to swing the twine guide 124 into the standby position (as seen by comparing FIGS. 10 and 12).

The latching mechanism further includes a latch tension spring 190 connected between the bolt assembly 170 fixed to the latch bar 154 and the front bolt assembly 178 fixed to the connecting bar 156 and intermediate bar 158 for yieldably biasing the latch bar in the forward direction (rightward viewing FIG. 9). As will be subsequently described, with the latching mechanism 152 actuated (i.e., with the tailgate 26 in its closed position), as the twine guide 124 shifts out of the standby position and into the operating position, the latch spring 190 causes the latch bar 154 to yieldably press against the peripheral surface of the disk 136 and slide therealong, as the disk rotates and then shift into latching interengagement with the notch 138. In this respect, since the return spring 142 is continuously biasing the arm 126 in the clockwise direction (viewing FIG. 9) to shift the twine guide 124 into the standby position, the operating position of the twine guide 124 corresponds with the disposition of the guide (or support arm 126) at the time the latch bar 154 shifts into latching interengagement with the notch 138. Accordingly, if the notch 138 were repositioned circumferentially on the disk 136 from the location illustrated in the drawings (or if the disk were rotated relative to the arm 126), the disposition of the twine guide 124 in its operating position would consequently shift nearer to or further from the right sidewall 20.

OPERATION

It will be appreciated that at the initiation of a baling cycle, the tailgate 26 is in the closed position and the twine guide 124 rests in the standby position, as shown in FIG. 13. Under these circumstances, the connecting link 156 and intermediate bar 158 have shifted to their respective forwardmost positions such that the latching mechanism 152 is actuated, whereby the latch spring 190 biases the latch bar 154 forwardly against the cylindrical marginal surface of the disk 136. The baling cycle proceeds in the usual manner, with the pickup 46 and transfer mechanism 66 delivering crop material to the baling chamber 42 as the baler 10 is towed across the field, and the bale forming mechanism forming and compacting the delivered material into a round bale 82. As previously described, once the bale has reached full size, the wrapping cycle is triggered by any one of a variety of means responsive to the full size condition of the bale.

Upon commencement of the wrapping cycle, the twine dispenser 90 pivots out of the home position in the direction indicated by the arrow 192 in FIG. 6. On its way out of the house portion, the dispenser 90 engages the tang 140 depending from the arm 126, causing the arm 126 to swing in the direction indicated by the arrow 194 in FIG. 9 against the bias of the return spring 142. Consequently, the disk 136 rotates in the counterclockwise direction (viewing FIG. 9), such that the latch bar 154 yieldably pressing against the peripheral surface of the disk slides along the surface as the disk 136 rotates. Once the notch 138 is disposed in the "9 o'clock" position illustrated in FIG. 9, the latch spring 190 shifts the latch bar 154 forwardly (rightwardly viewing FIG. 9) into latching interengagement with the notch for retaining the twine guide 124 in the operating position.

The positions of the latch bar 154 corresponding to the standby and operating positions of the twine guide 124 may be discerned by contrasting FIG. 13 (standby position) and FIG. 9 (operating position). Particularly, the connecting bar 156, intermediate bar 158 and corresponding front bolt assembly 178 remain stationary, while the latch bar 154 shifts forwardly, such that the bolt assembly 170 on the rear of the latch bar 154 shifts within the slot 186 of the intermediate bar, while the medial slot 162 of the latch bar 154 allows the latch bar to shift relative to the bolt assembly 178. Additionally, the bushing 168 of the stationary bolt assembly 166 attached to the lug 164 slides within the frontal slot 160 of the forwardly shifting latch bar.

Once the twine guide 124 reaches the operating position, the twine dispenser 90 continues to pivot toward the left sidewall 18 beyond the support arm 126. As indicated by the phantom line in FIG. 10 depicting the path of movement of the twine dispenser 90, in order for the dispenser to disengage the tang 140 as the dispenser swings past the support arm 126, the arm must swing in the counterclockwise direction slightly beyond the position illustrated in FIG. 10 (corresponding to the operating position of the twine guide 124). Of course, the slight overtravel of the arm 126 causes the disk 136 to rotate slightly, which in turn shifts the latch bar 154 rearwardly (leftwardly viewing FIG. 10) in a relief movement against the bias of the latch spring 190. The respective slotted openings 160,162 and 186 of the latch bar 154 and intermediate bar 158 accommodate for such rearward shifting of the latch bar 154, while the latching mechanism 152 is actuated. Furthermore, once the dispenser 90 disengages the tang 140, the arm 126 and disk 136 shift clockwise to return to the position illustrated in FIG. 10.

As previously described, the wrapping cycle of the present embodiment consists of the twine dispenser 90 making only two passes through the baler. However, the principles of the present invention are equally applicable to a twine dispenser that makes more than two passes through the baler. In the present embodiment, for example, such a variation simply requires that the twine dispenser 90 not pivot to the home position until it is desired to actuate the twine cutting assembly 86 to sever the twine. In either case, it will be appreciated that the dangling strands of twine are not pulled by the inflowing crop material until the dispenser 90 has pivoted out past the arm 126 at the beginning of the cycle. Once the twine has been pulled into the baling chamber by the inflowing crop material, the towing vehicle is stopped, so that the inflow of crop material ceases and therefore accumulation of material on the twine guide 124 is minimized.

The twine guide 124 remains in the operating position as the twine dispenser 90 pivots between the sidewalls. As best shown in FIGS. 4 and 5, when the twine guide 124 is in the operating position, the guide is generally aligned along the fore-and-aft axis of the baler 10 with the rear drive roll 32 (i.e., between the twine dispenser 90 and the baling chamber 42), and generally at the same elevation as the rear inlet rolls 36,38. That is to say, the twine guide 124 is disposed for engaging the strands of twine as the dispenser 90 swings in the vicinity generally defined between the guide and the right sidewall 20 so as to prevent the twine from wrapping around the extreme right end of the bale 82.

Accordingly, with the present embodiment, the twine guide 124 engages the twine wrapped around the bale and maintains the twine a predetermined distance from the right sidewall 20, as the dispenser 90 returns to the home position in the direction indicated by the arrow 196 in FIG. 4. However, before the twine guide 124 provides its twine guiding function, the dispenser 90 on its way home, pivots into engagement with the tang 140 and swings the support arm 126 in the counterclockwise direction slightly beyond the position illustrated in FIG. 4 in the manner previously described so that the dispenser may pass the arm without deactuating the latching mechanism. Additionally, before the twine is engaged by the twine guide 124, the twine initially engages the downwardly tapering edge 140a of the tang 140. As the dispenser continues to approach the right sidewall 20, the twine slips downwardly off the tang 140 and is then caught by the hook section 124a of the twine guide 124. It will be appreciated that the tang 140 also serves as a guide once the twine is caught by the hook section 124a, preventing the twine from shifting laterally toward the left sidewall 18 beyond the tang. Once the dispenser 90 pivots past the support arm 126, twine which would otherwise wrap around the right end of the bale 82 is engaged by the twine guide 124 and held out away from the right sidewall 20, as best depicted in FIG. 4.

As the twine dispenser 90 pivots into its home position, the twine cutting assembly 86 is activated to sever the twine as previously described. Once the strands of twine have been cut, the remainder of the severed length of twine is pulled into the baling chamber by the rotating bale, while the strands of twine dangling from the dispenser 90 are disposed exteriorly of the path of inflowing crop material.

Thereafter, the tailgate 26 is raised out of the closed position so that the wrapped bale may be discharged from the baling chamber 42. The push plate 174 swings generally rearwardly with the tailgate 26, as indicated by the arrow 198 in FIG. 11, allow the deactuating spring 188 to shift the connecting bar 156 and intermediate bar 158 rearwardly. As the connecting and intermediate bars 156,158 initially shift rearwardly, the brass bushing 179 of the front bolt assembly 178 slides rearwardly within the medial slot 162 of the latch bar 154, while the latch bar 154 remains stationary such that the intermediate bar 158 slides about the brass bushing 172 of the bolt assembly 170. In other words, the bolt assembly 178 connected to the connecting and intermediate bars 156,158 shifts rearwardly toward the bolt assembly 170 connected to the latch bar 154 to relieve the tension of the latch spring 190. As illustrated in FIG. 11, the bushing 179 eventually engages the rearward end of the slot 162 and the forward end of the slot 186 abuttingly engages the bushing 172 so that further rearward shifting of the connecting and intermediate bars 156,158 is imparted to the latch bar 154. Preferably, the latching mechanism is constructed so that the bushings 172 and 179 "bottom out" within the respective slots 186 and 162 simultaneously; although it is only necessary to have the bushing 172 "bottom out" within the slot 186 of the intermediate bar 158 to cause the latch bar 154 to shift rearwardly with the connecting and intermediate bars 156,158. Even though the tension of the latch spring 192 is eventually relieved, the deactuating spring 188 continues to urge the connecting and intermediate bars 156,158 rearwardly and therefore the latch bar 154 rearwardly. The latch bar 154 ultimately shifts sufficiently rearwardly to disengage the notch 138 of the disk 136, allowing the return spring 142 to swing the support arm 126 toward the right sidewall 20 and thereby shift the twine guide into its standby position. It will be appreciated that although the push plate 174 eventually disengages the connecting bar 156, rearward travel of the bars 154,156,158 is checked by the frontal slot 160 defined within the latch bar 154, the forward end of which abuttingly engages the bushing 168 connected to the stationary lug 164 (see FIG. 12).

After the wrapped bale has been discharged, the tailgate 26 returns to its closed position so that baling operations may be resumed. As the tailgate 26 swings into the closed position, the push plate 174 engages the connecting bar 156, pushing the connecting bar and intermediate bar 158 forwardly (rightwardly viewing FIG. 12) against the bias of the deactuating spring 188. The latch bar 154 also shifts forwardly as the front bolt assembly 178 connected to the connecting and intermediate bars 156,158 pulls the bolt assembly 170 forwardly via the latch spring 190. However, forward shifting of the latch bar 154 is eventually checked by the peripheral surface of the disk 136 (i.e., once the latch bar shifts into engagement with the disk). The connecting bar 156 and intermediate bar 158 continue to shift forwardly until the tailgate 26 reaches the closed position, thereby tensioning the latch spring 190 so that the latch bar 154 yieldably presses against the peripheral surface of the disk 136. In this respect, the latching mechanism 152 is once again actuated and baling operations may be resumed.

Although the latching mechanism 152 of the present embodiment is actuated and deactuated in response to swinging of the tailgate 16 into and out of its closed position, it is entirely within the ambit of the present invention to actuate and deactuate the latching mechanism by various other means. For example, the latching mechanism 152 may alternatively be coupled with the twine dispenser 90 or cutting assembly 86 for deactuating the mechanism once the twine has been severed. The latching mechanism may also be altered or reconstructed in a variety of ways. For example, the twine guide may be spring biased into the operating position and releasably retained in the standby position.

A second embodiment of the present invention is provided on the baler 300 illustrated in FIGS. 14–17. Mounted to the right sidewall 302 of the baler is a twine guiding assembly 301 having a retractable twine guide 304 that is shiftable into and out of an operating position (shown with full lines in FIG. 16). As with the previous embodiment when the guide 304 is in the operating position, it is disposed for engaging the twine as the twine dispenser (not shown) swings toward the right sidewall 302 for spacing twine, which would otherwise wrap around the right end of the bale, a certain distance from the right end of the bale (see also FIG. 15). As best shown in FIGS. 16 and 17, the twine guide 304 is disposed generally at the same elevation as the rear inlet rolls 306,308 and generally behind and below the starter roll 310 when in the operating position. Accordingly, the twine guide 304 is disposed generally within the path of inflowing crop material when the guide is in the operating position, such path of material being defined by the wide pickup 312 and transfer mechanism 314 and extending generally upwardly and rearwardly from the ground to the baling chamber 316.

The twine guide 304 is shiftable generally upwardly and rearwardly, as indicated by the arrow 318 in FIG. 16, to a substantially horizontal retracted, standby position (shown in phantom in FIG. 16). In this respect, it will be appreciated that the term "retractable" used herein shall be interpreted relatively broadly. That is to say, although the twine guide 304 does not shift out of the operating position to a standby position in which the guide is nearer to the right sidewall 302, the guide is retractable from the operating position and out of the path of inflowing crop material to a standby position.

An elongated support rod 320 is rotatably supported on the right sidewall 302 for carrying the twine guide 304 between its operating and standby positions. Specifically, the rod 320 is slidably received within an elongated, cylindrically shaped, tubular sleeve 322 that is welded to a mounting plate 324. The mounting plate is fastened to the right sidewall 302 by a bolt assembly 326.

As illustrated in FIGS. 15 and 17, the sleeve 322 allows for longitudinal adjustment of the support rod 320 relative thereto. In the present embodiment, the support rod 320 may be selectively disposed in a number of longitudinally spaced positions relative to the first sleeve 322 so that the spacing of the twine guide 304 relative to the right sidewall 302 is adjustable. The preferred structure for allowing such selective adjustment includes a second relatively shorter, cylindrically shaped, tubular sleeve 328 which slidably receives the support rod 320 therein. A second bolt assembly 330 spaced rearwardly from the relatively shorter bolt assembly 326, assists with fastening the mounting plate 324 to the right sidewall 302 and, supports a stationary retaining plate 332 having a claw-shaped end which fits slidably about the support rod 320. It will be appreciated that the retaining plate 332 and sleeve 322 rotatably retain the second sleeve 328 therebetween, when the support rod 320 is received within these components, for preventing lateral shifting of the second sleeve 328 relative to the right sidewall 302. A tubular spacer 334 is also supported on the second bolt assembly 330 for spacing the retaining plate 332 the necessary distance from the right sidewall 302. If desired, the retaining plate 332 and spacer 334 may be secured to one another by suitable means such as welding. Moreover, the second sleeve 328 includes a pair of diametrically opposed openings (not shown), and the support rod 320 includes a plurality of corresponding longitudinally spaced, diametrical through-holes 336 (shown in phantom in FIGS. 15 and 17) which may be selectively aligned with the openings defined in the sleeve 328. A cotter pin 338 is received within the sleeve openings and a selected through-hole 336 for releasably intercoupling the support rod 320 and the second sleeve 328, thereby imparting rotational movement of the support rod 320 to the second sleeve 328, and vice versa. The cotter pin 338 also prevents lateral shifting of the support rod 320 relative to the second sleeve 328 and therefore the right sidewall 302 so as to maintain the position of the twine guide 304 relative to the sidewall 302.

The twine guiding assembly 301 further includes structure for yieldably biasing the twine guide 304 into the operating position, which in the present embodiment comprises a recoil tension spring 340. The recoil spring 340 is connected between a crank member 342 fixed to the second sleeve 328 and a relatively stationary L-shaped bracket 344 attached to the right sidewall 302. It will be appreciated that the recoil spring 340 is configured for allowing inflowing crop material engaging the twine guide 304 to shift the guide out of the operating position against the bias of the spring so as to minimize interference with the inflow of crop material and reduce accumulation of trash and material on the twine guide. In the present embodiment, the spacer 334 also functions as a stop disposed for engaging the crank member 342 when the twine guide 304 is in the standby position for preventing shifting of the guide beyond the standby position.

Accordingly, inflowing crop material engaging the forwardly facing boundary of the twine guide 124, swings the guide out of the operating position in the direction indicated by arrow 318. Such swinging of the guide causes the support member 320 and second sleeve 328 to rotate in the counterclockwise direction (viewing FIG. 16), which in turn shifts the crank member 342 rightwardly viewing FIG. 15 to stretch the recoil spring 340. Of course, the recoil spring 340 returns the twine guide 304 to the operating position once the inflow of crop material has stopped. In this respect, the twine guide 304 is normally out of its operating position during bale formation as crop material is delivered to the baling chamber 316, yet returns to the operating position as the wrapping cycle begins (i.e., once the inflow of crop material has ceased).

A third embodiment of the present invention is shown in FIGS. 18–20. The third embodiment includes a twine guide 400 carried on a swingable arm 402 similar to the first embodiment (shown in FIGS. 1–13). However, a hydraulic cylinder 404 is provided for shifting the twine guide 400 into and out of its operating position. As perhaps best shown in FIG. 18, the cylinder 404 is pivotally connected between the arm 402 and twine cutter 406 for controlling operation of both the twine cutter and twine guide, as will subsequently be described. With respect to the twine guide 400, the rod end of the hydraulic cylinder 404 is fastened to a crank 407 which is fixed to the rotatable shaft 408 carrying the arm 402.

The twine cutter 406 is also similar to the first embodiment and generally includes an upper stationary blade 410 and a lower blade 412 selectively swingable toward the upper blade for severing twine therebetween. Mounted to the end of the lower blade 412 is a relatively small triangular plate 414 which prevents the twine from slipping off the lower blade as the blade swings upwardly to the cutting position. The linkage operably connecting the cylinder 404 with the blades includes a swingable crank 416 connected to the cylinder, and an angled rod 418 connected between the crank and cylinder.

Extension of the cylinder 404 swings the arm 402 toward the operating position of the twine guide 400 and rotates the crank 416 in a counterclockwise direction (viewing FIG. 18). The angled rod 418 in turn transfers counterclockwise rotation of the crank 416 to swinging movement of the lower blade 412 and thereby shifts the blade out of the cutting position. A stop 420 attached to the right sidewall 422 is configured to engage the arm 402 for preventing swinging movement of the arm beyond the operating and retracted positions of the twine guide 400. The blades 410, 412 similarly have a pin-and-slot connection 424 for limiting swinging movement of the lower blade 412 between the cutting and open positions of the cutter. Thus, if the cutter 406 reaches its open position (shown in FIG. 18) before the twine guide reaches its operating position, the pin will bottom out within the slot to prevent further swinging movement of the lower blade 412 such that continued extension of the cylinder 404 will swing the arm 402 until it engages the stop 420. Retraction of the cylinder 404 will conversely shift the twine guide 400 to its retracted position and swing the lower blade 412 to the cutting position. Because of the relatively small size of the hydraulic cylinder 404, the cylinder extends and retracts relatively quickly (i.e., the arm 402 "flips" to and from the operating position). Consequently, the twine guide 400 and twine cutter 406 shift virtually simultaneously.

Similar to the other embodiments discussed hereinabove, swinging movement of the twine dispenser 426 is controlled by a hydraulic cylinder 428 (shown only in FIG. 20). Furthermore, the dispenser 426 is configured to swing between the blades 410, 412 as it passes the cutter 406 for ensuring that the strands of twine are placed between the blades when the dispenser is in its home position. The sequence of operation of the twine cutter 406 and the dispenser 426 therefore must be coordinated so that the blades 410, 412 are placed in the open position before the dispenser passes the cutter, otherwise, the dispenser will "crash" into the blades. Of course, the operation of the twine guide 402 and the dispenser 426 must also be coordinated so that the guide is placed in its operating position before the dispenser returns to its home position.

In this respect, the wrapping apparatus is provided with a sequencing circuit, generally denoted by the numeral 430 (FIG. 20), for coordinating the sequence of operation of the twine guide 400, twine cutter 406 and twine dispenser 426. The circuit 430 has a pair of ports 432 and 434 which connect to a single source of pressurized fluid, whereby the guide/cutter cylinder 404 and the dispenser cylinder 428 are controlled by a common fluid source. As those of ordinary skill in the art will appreciate, this configuration is particularly valuable in light of the fact that most towing vehicles have a limited number of hydraulic jacks for supplying pressurized fluid to the baler. As shown in FIG. 20, the ports 432 and 434 connect to a tractor remote valve which allows the operator to remotely control fluid supply to either port.

The sequencing circuit 430 includes a pair of fluid flow lines 436 and 438 extending between the ports 432 and 434 and the dispenser cylinder 428. Similarly, a second pair of fluid flow lines 440 and 442 are provided for interconnecting the guide/cutter cylinder 404 and the ports 432 and 434. Therefore, pressurized fluid supplied to port 432 flows to lines 436 and 440, while fluid supplied to port 434 flows to lines 438 and 442. The circuit 430 further includes three pilot-operated valve assemblies, generally designated by the numerals 444, 446 and 448. The valve assemblies are similarly constructed, and accordingly, only one of the assemblies will be described in detail with the understanding that the other assemblies have like components. The valve assembly 444 includes an adjustable relief valve 444a, a check valve 444b and a counterbalance pilot line 444c which serves to open the relief valve when the fluid upstream from the valve reaches the selected relief pressure. The counterbalance pilot line 444c minimizes the risk of valve overload when the primary pilot line fails to open the relief valve, although this is rarely a problem with the illustrated embodiment. An adjustable flow restrictor 450 is interposed within line 436 for controlling the flow rate through the line 436. It will be appreciated that the operator is able to vary the speed of the dispenser 426, and thereby the twine spacing on the bale, by adjusting the flow rate through line 436.

Assuming the wrapping cycle begins with the dispenser 426 in its home position (i.e., the dispenser cylinder 428 fully extended), the twine guide 400 in its retracted position and the cutter in its cutting position (i.e., the guide/cutter cylinder fully retracted), the tractor remote valve is adjusted to supply pressurized fluid to the port 434. Pressurized fluid flows through line 442 to extend the guide/cutter cylinder 404 and thereby shift the guide 400 to its operating position and the cutter to its open position. The fluid returning from the guide/cutter cylinder 404 flows freely through the line 440 and over the check valve of the assembly 448 so that the cylinder extends virtually immediately. Pressurized fluid also flows through line 438 to the dispenser cylinder 428. The relief pressure of the valve 444a is preferably set relatively low so that the pressure of pilot line 452 opens the valve almost immediately. Although the valve assembly 444 does not restrict fluid flow returning from the dispenser cylinder 428 as it retracts, a one-way flow restrictor 454 is provided for restricting flow through line 436 and thereby slowing retraction of the cylinder 428. Consequently, the speed of the dispenser as it swings out of its home position is decreased sufficiently to allow the cutter to shift to its open position (i.e., allow the guide/cutter cylinder 404 to fully extend) before the dispenser moves past the cutter. If desired, the relief pressure of the valve 444a may be set so that the valve does not open until the guide/cutter cylinder has fully extended, in which case the restrictor 454 may be removed.

Fluid will continue to flow through lines 436,438 until the dispenser cylinder 428 is fully retracted. The valve assembly 446 prevents fluid backflow once the dispenser has reached its remote position and the supply to line 438 is shut off so as to prevent drifting of the dispenser out of the remote position. The valve assembly 444 also locks the circuit when the dispenser is in its home position for preventing inadvertent drifting into and out of the home position.

The dispenser 426 is returned to its home position simply by reversing the fluid flow from the remote tractor valve, which may be accomplished by manual manipulation of the valve or automatic controls. In either case, pressurized fluid supplied to the port 432 flows through line 436 and freely over the check valve 444b. As indicated above, the restrictor 454 restricts flow only in one direction and therefore the fluid also flows freely through the restrictor toward the dispenser cylinder 428. The relief pressure for the relief valve of the assembly 446 is set relatively low so that as soon as the pressurized fluid is supplied to the line 436, the pilot line 456 opens the valve. Thus, the dispenser 426 swings unrestricted toward its home position. The guide/cutter cylinder, on the other hand, is locked until the relief valve of the assembly 448 is opened. Particularly, fluid flow through the line 440 is checked by the assembly 448 until the pressure of the pilot line 458 is sufficient to overcome the selected relief pressure. Preferably, the relief pressure for the relief valve of the assembly 448 is set relatively high so that the relief valve does not open until the dispenser 426 reaches its home position (i.e., until the dispenser cylinder 428 is fully extended). It will be appreciated that when the dispenser 426 reaches its home position, the line 436 and pilot line 458 experience a pressure "spike" which in turn causes the relief valve of assembly 448 to open. Thereafter, the guide/cutter cylinder is retracted to actuate the cutter and shift the twine guide to its retracted position.

The circuit 430 therefore sequences operation of the twine guide 400, the twine cutter 406, and the twine dispenser 426 for preventing the dispenser from crashing into the cutter blades 410,412 and ensuring the twine guide is in its operating position before the dispenser returns to its home position. Further, the sequencing circuit 430 connects both cylinders 404,428 to a common source of hydraulic pressure so that the wrapping apparatus does not consume to sources of hydraulic pressure. Such a circuit is available from the Modular Controls Division of Vickers, Inc. of Carrol Stream, Ill. as Part No. MCD-5558, labeled the Counterbalance Control Package.

A fourth embodiment of the present invention is shown in FIGS. 21–25, as including a twine guide 500 mounted to the right sidewall of the baler 502 for movement into and out of an operating position (shown in solid lines in FIG. 22). Similar to the third embodiment, a power mechanism in the form of a hydraulic cylinder 504 is provided for shifting the twine guide 500 into and out of its operating position and for controlling operation of the twine cutter 506. However, as will subsequently be described, the twine guide 500 and twine cutter 506 are operably connected to the same end of the hydraulic cylinder 504 to ensure simultaneous operation of the guide and cutter.

The cutter 506 includes a stationary blade 508 and a swingable blade 510 cooperatively severing twine therebetween when the swingable blade 510 is swung upwardly into a cutting position by the hydraulic cylinder 504. A pair of vertical mounting plates 512 and 514 are disposed on the outside of the right sidewall 502, with the upper plate 512 being fastened to the sidewall by a bolt assembly 516 and the lower plate 514 being fastened to the upper plate 512 by a bolt assembly 518. The stationary blade 508 is in turn fastened to the lower vertical plate 514 by bolt assembly 520 and to a tab 522 secured to the inside of the right sidewall 502 by a bolt assembly 524. A bolt assembly 526 serves to swingably support the blade 510 on the stationary blade 508, with a compression spring 528 being provided on the shank of the bolt assembly 526 to maintain the blades in a side-by-side yet relatively shiftable condition.

A pin 530 pivotally anchors the upper end of the hydraulic cylinder 504 to the upper vertical plate 512, while the lower end of the cylinder 504 is operably connected to the twine guide 500 and the swingable blade 508 of the cutter 506 by structure, generally referenced by the numeral 532. Particularly, the structure 532 includes a link 534 pivotally connected between the lower end of the cylinder 504 and the outer end of the swingable blade 510. It will be noted that a pin 535 serves to connect the upper end of the link 534 to the lower end of the cylinder 504, while a bolt assembly 536 connects the link 534 to the outer end of the blade 510. Accordingly, when the cylinder 504 extends, the blade 510 swings upwardly about bolt assembly 526 into its cutting position alongside the stationary blade 508. On the other hand, when the cylinder 504 retracts, the blade 510 swings downwardly about bolt assembly 526 away from the stationary blade 508.

The structure further includes a swingable arm 538 for carrying the twine guide 500 into and out of its operating position in the manner described hereinabove. As perhaps best shown in FIG. 24, a horizontal support plate 540 is secured to the outwardly projecting flange 502a of the right sidewall by suitable means, such as mechanical fasteners (not shown), and supports horizontal block 542. The outer end of the arm 538 is fixed to an upright shaft 544 such that swinging of the arm 538 coincides with rotation of the shaft 544. The shaft 544 projects through the horizontal block 542, with a sleeve 546 being disposed therebetween for allowing the shaft 544 to rotate relative to the block 542. Located at the upper end of the shaft 544 is a bevel gear 550, with a pin 552 (see FIG. 24) extending diametrically through the shaft 544 and the hub of the bevel gear 550 to prevent relative rotational movement therebetween. The bevel gear 550 intermeshes with a second bevel gear 554 carried on a horizontally extending, rotatable shaft 556. It will be noted that the shaft 556 is journaled for rotational movement at its forward end by a sleeve 558 fixed to the front side of the lower mounting plate 514 and at its rearward end by a vertical block 560 fastened to the horizontal block 542 by bolt assemblies 562. Similar to the bevel gear 550, relative rotational movement between the second bevel gear 554 and shaft 556 is prevented by a pin 564 extending diametrically through the shaft and hub of the gear. The structure 532 further includes a crank 566 having an upper end pivotally connected to the lower end of the hydraulic cylinder 504 by the pin 535 and a lower end fixed to the shaft 556. Accordingly, when the cylinder 504 extends the crank 566 swings in a counterclockwise direction (when viewing FIG. 23), causing the horizontal shaft 556 to rotate in the same direction. The bevel gears 550,554 serve to transfer such rotation of the shaft 556 into swinging movement of the arm 538 via the upright shaft 544, such that the twine guide 500 is retracted from its operating position. Of course, retraction of the cylinder 504 shifts the twine guide 500 to its operating position. Moreover, it will be noted that operation of the twine guide 500 and cutter 506 occur simultaneously.

As shown in FIG. 25, a sequencing circuit 568 is provided for connecting the hydraulic cylinder 504 for the twine guide 500 and twine cutter 506 and the hydraulic cylinder 570 (shown only in FIG. 25) for the twine dispenser 572 to a common source of pressurized fluid. Particularly, the circuit 568 includes a pair of fluid flow lines connecting the dispenser cylinder 570 to a remotely controlled, solenoid-operated valve 578, although it will be appreciated that the principles of the present invention are equally applicable to a sequencing circuit connected to a manually-operated tractor remote valve. Similarly, a second pair of fluid flow lines 580 and 582 are provided for connecting the guide/cutter cylinder 504 to the valve 578. Thus, pressurized fluid flows to lines 576 and 582 when the valve is in the position shown in FIG. 25, while pressurized fluid flows through lines 574 and 580 when the solenoid is activated to shift the valve rightwardly against the spring bias. A pilot-operated valve 584 is interposed within the line 580, for purposes which will subsequently be described, and includes an adjustable relief valve 584a, a check valve 584b, and a counterbalance pilot line 584c. An adjustable one-way flow restrictor assembly 586 is interposed within the line 576 for controlling the flow rate therethrough. It will be appreciated that the operator is able to vary the return speed of the dispenser 572, and thereby the twine spacing on the bale, by adjusting the flow rate through the line 576.

Assuming the wrapping cycle begins with the dispenser 572 in its home position (i.e., the dispenser cylinder 570 fully extended), the twine guide 500 in its retracted position and the cutter 506 in its cutting position (i.e., the guide/cutter cylinder 504 fully extended), pressurized fluid is supplied to lines 576 and 582 to extend the guide/cutter cylinder 504 and thereby simultaneously shift the guide 500 to its operating position and the swingable blade 510 of the cutter 506 to its open position. The fluid returning from the guide/cutter cylinder flows freely through the line 580 and over the check valve 584b of the assembly 584 so that the cylinder retracts virtually immediately. Further, the pressurized fluid supplied to line 576 flows freely over the check valve 586a of the assembly 586 and causes the dispenser cylinder 570 to retract and thereby swing the dispenser 572 out of its home position. A one-way flow restrictor assembly 588 is provided for restricting flow through line 574 to slow retraction of the cylinder 570. Consequently, the speed of the dispenser 572 as it swings out of its home position is decreased sufficiently to allow the cutter to shift to its open position (i.e., allow the guide/cutter cylinder 504 to fully extend) before the dispenser moves past the cutter. Fluid will continue to flow through lines 576 and 574 until the dispenser cylinder 570 is fully retracted.

The dispenser 572 is returned to its home position simply by shifting the valve 578 rightwardly (when viewing FIG. 25) to supply pressurized fluid to the line 574. The fluid flows freely over the check valve 588a of the assembly 588 to extend the cylinder 570. As indicated above, the flow restrictor assembly 586 may be adjusted to control fluid flow from the cylinder 570 through the line 576 so that the speed of the twine dispenser 572 may be varied as it returns to its home position. The guide/cutter cylinder 504, on the other hand, is locked until the relief valve 584a of the assembly 584 is opened. Particularly, fluid flow through the line 580 is checked by the assembly 584 until the pressure of the pilot line 584c is sufficient to overcome the selected relief pressure. Preferably, the relief pressure for the relief valve 584a is set relatively high so that the relief valve does not open until the dispenser 572 reaches its home position (i.e., until the dispenser cylinder 570 is fully extended). It will be appreciated that when the dispenser 572 reaches its home position, the lines 574,570 and pilot line 584c experience a pressure "spike" which in turn causes the relief valve 584a of assembly 584 to open. Thereafter, the guide/cutter cylinder 504 is extended to simultaneously actuate the cutter 506 and shift the twine guide 500 to its retracted position.

The circuit 568 therefore sequences operation of the twine guide 500, the twine cutter 506 and the twine dispenser 572 for preventing the dispenser from crashing into the cutter blades 510,512 and ensuring the twine guide 500 is in its operating position before the dispenser returns to its home position. Further, the sequencing circuit 568 connects both cylinders 504,570 to a common source of hydraulic pressure so that the wrapping apparatus does not consume two sources of hydraulic pressure. Such a circuit is available from the Modular Controls Division of Vickers, Inc. of Carrol Stream, Ill. as Part No. MCD-5389.

The preferred forms of the invention described above are to be used as illustration only, and should not be utilized in a limiting sense in interpreting the scope of the present invention. Obvious modifications to the exemplary embodiments, as hereinabove set forth, could be readily made by those skilled in the art without departing from the spirit of the present invention. For example, the baler may be provided with more than one twine guide for a twine dispenser which swings beyond both sidewalls, or when employing two dispensers for interlacing the twine.

The inventors hereby state their intent to rely on the Doctrine of Equivalents to determine and assess the reasonably fair scope of the present invention as pertains to any apparatus not materially departing from but outside the literal scope of the invention as set forth in the following claims.

What is claimed is:

1. In a round baler having a pair of laterally spaced apart, upright sidewalls and apparatus for wrapping a bale with twine after the bale has been formed within the baling chamber, the improvement comprising:

a twine dispenser moveable generally between the sidewalls during a wrapping cycle for dispensing at least one strand of twine around the bale, said dispenser resting in a home position between successive wrapping cycles;

a twine cutter including a blade shiftable into and out of a cutting position for severing the twine at the end of each wrapping cycle;

a retractable twine guide for spacing twine wrapped around the bale a certain distance inwardly from one of the sidewalls, said twine guide being shiftable into and out of an operating position in which the guide is disposed to engage and maintain the twine said distance from said one sidewall;

a power mechanism for shifting the blade of the twine cutter and the twine guide; and structure operably coupling the blade of the twine cutter and the twine guide to the power mechanism such that the power mechanism simultaneously shifts the blade of the twine cutter out of the cutting position and the twine guide into the operating position during the wrapping cycle, and simultaneously shifts the blade of the twine cutter into the cutting position and the twine guide out of the operating position at the end of each wrapping cycle.

2. In a round baler as claimed in claim 1, said power mechanism comprising an extendable and retractable element having one end connected to said structure and an opposite end fixed relative to said one sidewall, such that extension and retraction of the element shifts the blade of the twine cutter and the twine guide.

3. In a round baler as claimed in claim 2, said element comprising a hydraulic piston and cylinder assembly.

4. In a round baler as claimed in claim 3;

a hydraulic piston and cylinder unit coupled with the dispenser for moving the dispenser between the sidewalls; and a sequencing circuit for fluidly connecting the piston and cylinder assembly and the piston and cylinder unit to a common source of pressurized fluid.

5. In a round baler as claimed in claim 4, said sequencing circuit controlling fluid flow to said assembly and said unit so that the twine guide shifts to its operating position and the blade of the cutter shifts out of its cutting position before the dispenser returns to its home position.

6. In a round baler as claimed in claim 5, said cutter including a stationary blade cooperating with the shiftable blade to sever twine therebetween when the shiftable blade is in its cutting position, said dispenser being configured to pass between the blades of the cutter as the dispenser moves out of its home position, said sequencing circuit controlling fluid flow to said assembly and said unit so that the assembly shifts the twine guide to the operating position and the shiftable blade of the cutter out of its cutting position before the dispenser moves past the cutter.

7. In a round baler as claimed in claim 6, said sequencing circuit including a pair of ports connectable to the source of pressurized fluid, a first pair of fluid lines connecting the piston and cylinder assembly to the ports, and a second pair of fluid lines connecting the piston and cylinder unit to the ports.

8. In a round baler as claimed in claim 7, said sequencing circuit including a one-way flow restrictor interposed within the second pair of lines for restricting fluid flow through the unit as the dispenser swings out of its home position and thereby ensuring the assembly shifts the shiftable blade of the cutter out of its cutting position and the twine guide to its operating position before the dispenser moves past the cutter.

9. In a round baler as claimed in claim 8, said sequencing circuit including a pilot-operated valve interposed within the first pair of lines for preventing fluid flow through the assembly until the dispenser returns to its home position.

10. In a round baler as claimed in claim 2, said structure including a swingable arm carrying the guide into and out of its operating position, a crank pivotally connected to said one end of the extendable and retractable element, a rotatable shaft fixed to the crank such that pivoting of the crank caused by extension and retraction of the element rotates the shaft, and a gear assembly operably connecting the arm to the shaft such that rotation of the shaft swings the arm.

11. In a round baler as claimed in claim 10, said shaft being disposed for rotation about a substantially horizontal axis and said arm being disposed for swinging about a substantially perpendicular, vertical axis.

12. In a round baler as claimed in claim 11, said gear assembly comprising a pair of intermeshing bevel gears, one of which is fixed to the shaft and the other of which is fixed relative to the arm.

13. In a round baler as claimed in claim 12, said structure including a link pivotally connected between the blade of the cutter and said one end of the element.

14. In a round baler as claimed in claim 13, said cutter including a stationary blade cooperating with the shiftable blade to sever twine therebetween when the shiftable blade is in its cutting position, said cutter being swingable relative to the stationary blade.

15. In a round baler as claimed in claim 2, said structure including a link pivotally connected between the blade of the cutter and said one end of the element.

* * * * *